US010739796B2

(12) United States Patent
Martinez et al.

(10) Patent No.: US 10,739,796 B2
(45) Date of Patent: Aug. 11, 2020

(54) PRESSURE REGULATOR WITH RECONFIGURABLE HYDRAULIC DAMPENING

(71) Applicant: Proserv Operations, Inc., Houston, TX (US)

(72) Inventors: Gerardo Martinez, Houston, TX (US); Andy Patterson, Katy, TX (US)

(73) Assignee: Proserv Gilmore Valve LLC, Houston, TX (US)

( * ) Notice: Subject to any disclaimer, the term of this patent is extended or adjusted under 35 U.S.C. 154(b) by 0 days.

(21) Appl. No.: 16/352,468

(22) Filed: Mar. 13, 2019

(65) Prior Publication Data

US 2019/0212758 A1  Jul. 11, 2019

Related U.S. Application Data

(63) Continuation-in-part of application No. 16/137,014, filed on Sep. 20, 2018.

(Continued)

(51) Int. Cl.
*F16K 31/12* (2006.01)
*G05D 16/10* (2006.01)
(Continued)

(52) U.S. Cl.
CPC ....... *G05D 16/103* (2013.01); *E21B 33/0355* (2013.01); *E21B 33/06* (2013.01); *E21B 34/16* (2013.01); *Y10T 137/7801* (2015.04)

(58) Field of Classification Search
CPC ......... Y10T 137/2605; Y10T 137/2607; Y10T 137/7801; Y10T 137/7798; Y10T 137/7794

See application file for complete search history.

(56) References Cited

U.S. PATENT DOCUMENTS

| 402,600 A | 5/1889 | Kemp |
| 1,654,642 A | 1/1928 | Geissinger |

(Continued)

FOREIGN PATENT DOCUMENTS

| CH | 469928 A | 3/1969 |
| DE | 102014224979 A1 | 6/2016 |

OTHER PUBLICATIONS

PCT International Search Report and Written Opinion dated Dec. 1, 2017, for International Application No. PCT/US2017/061567.

(Continued)

*Primary Examiner* — Robert K Arundale
(74) *Attorney, Agent, or Firm* — Patterson + Sheridan, LLP

(57) ABSTRACT

A pressure regulator includes a regulated fluid volume, at least one vent passage and fluid supply passage, a dampening piston bore and a regulated fluid volume outlet passage, a regulated fluid pressure piston having a first surface side exposed to the regulated fluid volume, and a second surface side exposed outwardly of the body, an external biasing member contactable with the piston and providing a force on the piston inwardly of the body, a gate connected to the piston, a dampening piston disposed in the dampening piston bore, the dampening piston disposed between a dampening and regulated fluid volumes and including a recess including a band therein having at least one gap therethrough, the gap in the band forming a passage between the dampening piston and the piston bore communicable with a volume exterior to the region between the dampening piston and the piston bore.

14 Claims, 18 Drawing Sheets

Related U.S. Application Data

(60) Provisional application No. 62/561,783, filed on Sep. 22, 2017.

(51) Int. Cl.
  *E21B 33/06* (2006.01)
  *E21B 34/16* (2006.01)
  *E21B 33/035* (2006.01)

(56) References Cited

U.S. PATENT DOCUMENTS

| | | |
|---|---|---|
| 2,140,735 A | 12/1938 | Gross |
| 2,311,851 A | 2/1943 | McClure |
| 2,560,841 A | 7/1951 | Bishop |
| 2,605,108 A | 7/1952 | Stephens |
| 2,685,296 A | 8/1954 | Boosman |
| 2,729,226 A | 1/1956 | Jones |
| 2,731,975 A * | 1/1956 | Boals .................. G05D 16/107 137/116.5 |
| 2,799,523 A | 7/1957 | Parker |
| 2,811,979 A | 11/1957 | Presnell |
| 2,821,972 A | 2/1958 | Banker |
| 2,847,027 A | 8/1958 | Kumpman |
| 2,862,520 A | 12/1958 | Cordova |
| 2,867,463 A | 1/1959 | Snider |
| 2,892,644 A | 6/1959 | Collins |
| 2,906,290 A | 9/1959 | Harding et al. |
| 2,973,746 A | 3/1961 | Jupa |
| 3,022,794 A | 2/1962 | Pippenger |
| 3,114,391 A | 12/1963 | Kurtz |
| 3,145,723 A | 8/1964 | Chorkey |
| 3,189,049 A | 6/1965 | Carlson |
| 3,219,060 A | 11/1965 | Pearl et al. |
| 3,225,786 A | 12/1965 | Elliott |
| 3,279,805 A | 10/1966 | Quinson |
| 3,316,930 A | 5/1967 | Garduer |
| 3,352,394 A | 11/1967 | Longshore |
| 3,421,533 A | 1/1969 | Conn |
| 3,474,828 A | 10/1969 | Wheeler et al. |
| 3,485,225 A | 12/1969 | Bailey et al. |
| 3,533,431 A | 10/1970 | Kuenzel et al. |
| 3,536,085 A | 10/1970 | Taplin |
| 3,540,695 A | 11/1970 | Taylor |
| 3,587,647 A | 6/1971 | Walters |
| 3,598,148 A | 8/1971 | Kroffke |
| 3,635,436 A | 1/1972 | Tillman |
| 3,662,950 A | 5/1972 | McIntosh et al. |
| 3,683,694 A | 8/1972 | Granberg |
| 3,749,122 A | 7/1973 | Gold |
| 3,797,525 A | 3/1974 | Lieser |
| 3,913,620 A | 10/1975 | Pauliukonis |
| 3,949,645 A | 4/1976 | Masclet |
| 4,220,174 A | 9/1980 | Spitz |
| 4,240,634 A | 12/1980 | Wiczer |
| 4,253,481 A | 3/1981 | Sarlls, Jr. |
| 4,263,938 A | 4/1981 | Peters |
| 4,281,677 A | 8/1981 | Hoffman |
| 4,336,946 A | 6/1982 | Wheeler |
| 4,396,071 A | 8/1983 | Stephens |
| 4,444,216 A | 4/1984 | Loup |
| 4,458,718 A * | 7/1984 | Vick .................. F16K 11/0712 137/505 |
| 4,475,568 A | 10/1984 | Loup |
| 4,491,154 A | 1/1985 | Peters |
| 4,493,335 A | 1/1985 | Watson |
| 4,554,940 A | 11/1985 | Loup |
| 4,793,590 A | 12/1988 | Watson |
| 4,856,557 A | 8/1989 | Watson |
| 4,877,057 A | 10/1989 | Christensen |
| 4,890,645 A | 1/1990 | Andersen |
| 4,968,197 A | 11/1990 | Chen |
| 5,035,265 A | 7/1991 | Chen |
| 5,069,240 A | 12/1991 | Kurkjian, Jr. |
| 5,190,078 A | 3/1993 | Stoll et al. |
| 5,222,521 A | 6/1993 | Kihlberg |
| 5,301,637 A | 4/1994 | Blount |
| 5,771,931 A | 6/1998 | Watson |
| 5,797,431 A | 8/1998 | Adams |
| 5,901,749 A | 5/1999 | Watson |
| 6,041,804 A | 3/2000 | Chatufale |
| 6,257,268 B1 | 7/2001 | Hope et al. |
| 6,264,206 B1 | 7/2001 | Hashizawa et al. |
| 6,296,008 B1 | 10/2001 | Boyer et al. |
| 6,318,400 B1 | 11/2001 | Hope et al. |
| 6,382,256 B2 | 5/2002 | Kim et al. |
| 6,520,478 B1 | 2/2003 | Hope et al. |
| 6,523,613 B2 | 2/2003 | Rayssiguier et al. |
| 6,651,696 B2 | 11/2003 | Hope et al. |
| 6,668,861 B2 | 12/2003 | Williams |
| 6,702,024 B2 | 3/2004 | Neugebauer |
| 6,843,266 B2 | 1/2005 | Hope et al. |
| 6,901,960 B2 | 6/2005 | Roberts et al. |
| 6,983,803 B2 | 1/2006 | Watson et al. |
| 7,000,890 B2 | 2/2006 | Bell et al. |
| 7,073,590 B2 | 7/2006 | Neugebauer et al. |
| 7,159,605 B2 | 1/2007 | Thrash, Jr. et al. |
| 7,438,086 B2 | 10/2008 | Bento et al. |
| 7,520,297 B2 | 4/2009 | Bell et al. |
| 7,628,170 B2 | 12/2009 | Kok-Hiong et al. |
| 7,784,553 B2 | 8/2010 | Moreno |
| 7,959,161 B2 | 6/2011 | Seki et al. |
| 8,052,119 B2 | 11/2011 | Numazaki et al. |
| 8,245,729 B2 | 8/2012 | Zub |
| 8,246,055 B2 | 8/2012 | Asplund et al. |
| 8,342,202 B2 | 1/2013 | Nishio et al. |
| 8,397,742 B2 | 3/2013 | Thrash et al. |
| 8,408,244 B2 | 4/2013 | Gilcher |
| 8,453,678 B2 | 6/2013 | Neff et al. |
| 8,469,059 B1 | 6/2013 | Forst |
| 8,474,792 B2 | 7/2013 | Kubo et al. |
| 9,121,244 B2 | 9/2015 | Loretz et al. |
| 9,297,462 B2 | 3/2016 | Hattori et al. |
| 9,334,946 B1 | 5/2016 | Mason |
| 9,354,638 B2 | 5/2016 | Rebreanu et al. |
| 9,423,031 B2 | 8/2016 | Weintraub et al. |
| 9,874,282 B2 | 1/2018 | Wetzel et al. |
| 2004/0047748 A1 | 3/2004 | Roberts et al. |
| 2004/0138025 A1 * | 7/2004 | Yamaguchi ......... F16H 61/0021 477/156 |
| 2004/0173976 A1 | 9/2004 | Boggs |
| 2004/0262007 A1 | 12/2004 | Neugebauer et al. |
| 2005/0028864 A1 | 2/2005 | Thrash et al. |
| 2005/0067031 A1 | 3/2005 | Lee |
| 2005/0151099 A1 * | 7/2005 | Bell ..................... E21B 34/04 251/1.1 |
| 2006/0137744 A1 | 6/2006 | Anastas |
| 2006/0237064 A1 | 10/2006 | Benson |
| 2007/0000544 A1 | 1/2007 | Thompson |
| 2007/0069576 A1 | 3/2007 | Suzuki |
| 2007/0113906 A1 | 5/2007 | Sturman et al. |
| 2010/0044605 A1 | 2/2010 | Veilleux |
| 2010/0140881 A1 | 6/2010 | Matsuo |
| 2010/0154896 A1 | 6/2010 | Thrash, Jr. et al. |
| 2010/0243084 A1 | 9/2010 | Yoshioka et al. |
| 2011/0253240 A1 | 10/2011 | Otto et al. |
| 2012/0292550 A1 | 11/2012 | Meek |
| 2013/0032222 A1 | 2/2013 | Bresnahan |
| 2013/0037736 A1 | 2/2013 | Bresnahan |
| 2013/0146303 A1 | 6/2013 | Gustafson |
| 2013/0181154 A1 | 7/2013 | Robison et al. |
| 2014/0116551 A1 | 5/2014 | Smith |
| 2014/0377111 A1 | 12/2014 | Bagagli et al. |
| 2015/0060715 A1 | 3/2015 | Hoang |
| 2015/0152959 A1 | 6/2015 | Mangiagli et al. |
| 2015/0191996 A1 | 7/2015 | Weintraub |
| 2015/0191997 A1 | 7/2015 | Weintraub et al. |
| 2015/0276072 A1 | 10/2015 | Rebreanu et al. |
| 2015/0276083 A1 | 10/2015 | Druhan et al. |
| 2015/0369002 A1 | 12/2015 | Patterson |
| 2016/0103456 A1 | 4/2016 | Cho et al. |
| 2016/0123478 A1 | 5/2016 | Wetzel et al. |
| 2016/0230900 A1 | 8/2016 | Schulz et al. |
| 2016/0258531 A1 | 9/2016 | Ito et al. |

(56) References Cited

U.S. PATENT DOCUMENTS

| | | |
|---|---|---|
| 2016/0258537 A1 | 9/2016 | Heiderman et al. |
| 2017/0037984 A1 | 2/2017 | Frippiat et al. |
| 2017/0097100 A1 | 4/2017 | Patterson |
| 2017/0175916 A1 | 6/2017 | Huynh et al. |
| 2017/0189730 A1 | 7/2017 | Ernfjall |
| 2017/0220054 A1 | 8/2017 | Zhu et al. |
| 2017/0241563 A1 | 8/2017 | Simpson |
| 2017/0260831 A1 | 9/2017 | Green |
| 2017/0314689 A1 | 11/2017 | Osterbrink et al. |
| 2017/0370481 A1 | 12/2017 | Glazewski |
| 2018/0073652 A1 | 3/2018 | Weintraub |

OTHER PUBLICATIONS

PCT International Search Report and Written Opinion dated Jan. 31, 2018, for International Application No. PCT/US2017/051550.
PCT International Search Report and Written Opinion dated Jun. 23, 2015, for International Application No. PCT/US2014/062114.
PCT International Search Report and Written Opinion dated Nov. 14, 2019, for International Application No. PCT/US2019/046323, 13 pages.

\* cited by examiner

PRESSURE REGULATOR WITH RECONFIGURABLE HYDRAULIC DAMPENING

CROSS-REFERENCE TO RELATED APPLICATIONS

This application is a continuation-in-part of U.S. patent application Ser. No. 16/137,014, filed Sep. 20, 2018 and claims the benefit of U.S. provisional patent application Ser. No. 62/561,783, filed Sep. 22, 2017, which are herein incorporated by reference.

BACKGROUND

Field

The present invention relates to pressure regulators. More particularly, the present invention relates to pressure regulators useful for regulating the hydraulic pressure in a fluid circuit configured to open and close a blowout preventer surrounding an opening in fluid communication with a bore hole used for the drilling for, and production of, hydrocarbons from subsurface formations, as well as for other hydraulic applications, wherein the dampening of the response of the regulator to a change in the regulated pressure in the fluid circuit is user selective.

Description of the Related Art

Hydraulic circuits used to open and close blowout preventers, or other fluid operated devices such as valves in a hydraulic control circuit, typically must maintain a desired or "set point" operating pressure available for the operation of the fluid operated device. The set point pressure is typically maintained with a tolerance on the order of 1 to 10% of the center of the set point range. The operation of the blowout preventer, as well as of the hydraulic components in a hydraulic control circuit, can cause undesirable changes in the pressure of the fluid in the hydraulic circuit which is supplied to the hydraulically operated component(s), leading to undesirable performance thereof. For example, where the fluid of the hydraulic circuit is used to close the rams of a blowout preventer, a sudden drop in fluid pressure can occur as the rams begin moving to the closed position.

Pressure regulators are placed in a hydraulic circuit between a source of high pressure fluid at or above the set point pressure of the hydraulic circuit and a hydraulically operated component, to selectively fluidly connect the pressure regulated fluid which operates a hydraulically operated component with the high pressure fluid, when the regulated fluid pressure in the hydraulic fluid circuit is too low. Additionally, the pressure regulator is simultaneously fluidly located between the pressure regulated hydraulic circuit fluid and a vent maintained at a pressure below the set point pressure of the hydraulic fluid circuit, and the pressure regulator selectively places the regulated fluid in communication with the vent when the pressure of the regulated fluid exceeds the desired set point.

In current pressure regulators, the regulator body typically includes a supply port and a vent passage leading inwardly thereof, a regulated pressure outlet leading inwardly thereof, and a seal carrier plate, configured as a generally rectangular gate or plate, having openings therein which are located within the seal carrier plate at positions such that, as the seal carrier plate moves within the body of the regulator, the openings are selectively aligned with none of the supply or vent passages, with the vent passage and not the supply passage if the regulated pressure exceeds the pressure set point value, and with the supply passage and not the vent passage when the supply pressure falls below the pressure set point value. The seal carrier plate is biased, by an external spring structure, to position the seal carrier plate, when the regulated pressure is within the pressure set point upper and lower tolerance limits, so that both the supply passage and vent passage, and the fluids therein, are isolated from the pressure regulated fluid. The spring force is balanced by the regulated pressure bearing on a piston structure located between the regulated pressure volume of the regulator and the spring structure, with the piston structure connected through a stem extending therefrom to the seal carrier plate. When the regulated pressure exceeds the set point pressure, the force of the piston against the springs is increased, tending to move the seal carrier plate in the direction of the springs and thereby compress the springs, and simultaneously moving the vent opening in the spring plate into at least a partial overlapping position with respect to the lower pressure vent passage, thereby allowing the higher pressure fluid in the regulated fluid volume to communicate with the lower pressure region through the vent passage, thereby reducing the pressure in the regulated fluid back to within the set point range limits. When this occurs, the pressure on the piston is reduced, and the piston and seal carrier plate connected thereto move back to the steady state condition by the force of the spring, wherein both the vent and supply passages are isolated from the regulated fluid passage. This occurs because the spring force acting to push the piston inwardly of the regulator body is selected to balance with the force on the piston caused by the regulated fluid within the set point range limits acting on the surface area of the piston. If the fluid pressure of the regulated fluid in the regulator falls, the pressure thereof on the piston is reduced, the spring force and pressure force on the piston no longer are balanced, and the springs urge the seal carrier plate in the direction of the regulator body, thereby positioning a supply opening in the seal carrier plate to become at least partially aligned with the supply passage, wherein the higher supply pressure fluid communicates with the regulated fluid and boosts the regulated pressure back to within the set point range limits, which causes the piston to compress the springs and move the seal carrier plate back to the steady state, balanced, condition.

One issue which can occur during the use of the regulator where the regulated pressure spikes upwardly or downwardly, is cycling of the seal carrier plate, also known as chatter. This occurs when the seal carrier plate moves rapidly between the condition where the vent is in communication with the regulated fluid or the supply passage is in communication with the regulated fluid, and then the seal carrier plate moves to its steady state position, but overshoots that position, resulting in the seal carrier plate moving rapidly back and forth and sequentially, and repeatedly, exposing the regulated fluid to the vent and the supply pressures, or where the disconnection of the vent or supply to the regulated fluid occurs too rapidly, pressure waves will travel in the hydraulic circuit. For example, where a vented state of the regulator is rapidly terminated, a pressure spike can occur in the regulated fluid, resulting in another venting event, followed by another spike, etc. The same can occur in the event of rapidly closing off the high pressure supply passage from the regulated fluid passage. In an attempt to ameliorate these effects, the seal carrier plate typically has a second piston structure aligned with the piston which is in communication with the regulator fluid and pressure, in a cavity in the regulator body on the side of the seal carrier plate opposite to the first piston. A feedback line or pressure relief line connects to this cavity. As the seal carrier plate moves in response to variations on the regulated pressure, the movement of the second piston draws fluid into, or exhausts fluid from, the cavity within which the piston is received, tending to dampen or reduce the speed of movement of the seal carrier plate, resulting in slower opening and closing of communication of one of the vent or supply passages with the regulated fluid passage, and lower likelihood of seal carrier plate overshoot. However, this dampening is not variable, in that the diameters of the fluid passages feeding the dampening cavity, and thus the fluid restriction on fluid in the fluid circuit passages feeding the dampening cavity, is fixed, and thus if a different dampening characteristic is desired, a different regulator having a different dampening characteristic must be used.

SUMMARY

A pressure regulator includes an internal hydraulic dampening circuit having interchangeable, and thus user selectable, dampening characteristics.

In one aspect, the pressure regulator includes a body providing a regulated fluid volume, at least one vent passage and fluid supply passage, a dampening piston bore and one regulated fluid volume outlet passage, a regulated fluid pressure piston having a first surface side exposed to the regulated fluid volume, and a second surface side exposed outwardly of the body, an external biasing member contactable with the second surface side of the piston and providing a force on the piston directed inwardly of the body, a gate connected to the piston and having a first seal and a second seal, a dampening piston disposed in the dampening piston bore, the dampening piston disposed between a dampening volume and the regulated fluid volume, the dampening piston including a recess including a band therein having at least one gap therethrough, the gap in the band forming a passage wherein a volume formed between the dampening piston and the piston bore is communicable with a volume exterior to the region between the dampening piston and the piston bore.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
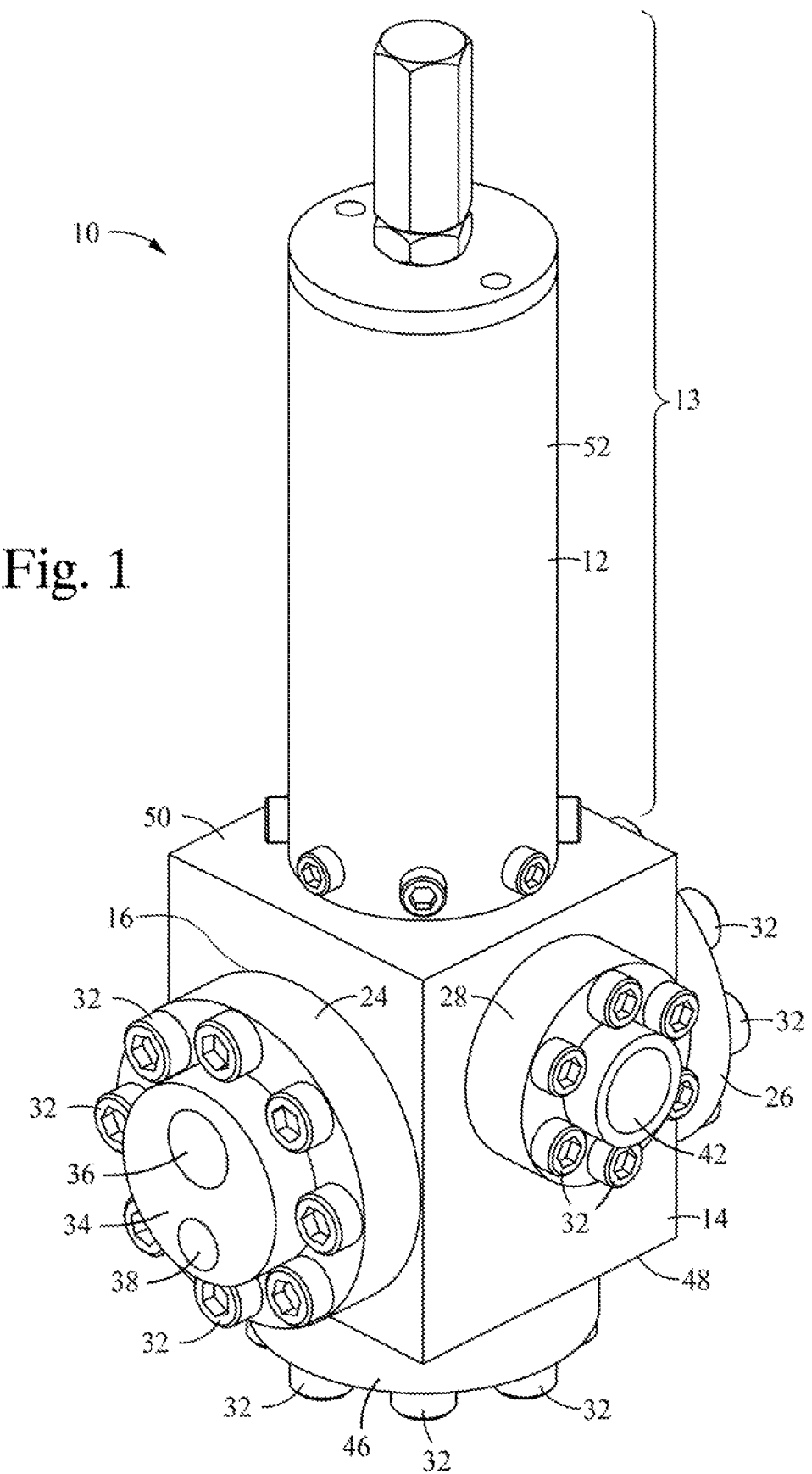
FIG. 1 is an isometric view of a pressure regulator hereof.

Referring initially to FIG. 1, an exterior isometric view of regulator 10 is shown, wherein the regulator 10 generally includes a spring housing 12 and a body 14, wherein the spring housing 12 and the body 14 are interconnected. The body 14 includes a pair of opposed functional openings 16, 18 (FIG. 4) extending inwardly of the body 14 to partially receive a pair of functional plugs 24, 26 therein, wherein the functional plugs 24, 26 are connected to the body 14 by pluralities of bolts 32 or other fasteners received in threaded bores in the body 14 as will be detailed further herein. In this embodiment, the body 14 is a generally cuboid structure wherein four adjacent side faces are rectangular in plan view, and the remaining two opposed faces are generally square in plan view. The first functional plug 24 partially extends inwardly of the functional opening 16 in a first of the rectangular faces (FIG. 4) and includes an outer face 34 from which a supply passage 36 and a vent passage 38 extend inwardly of the first functional plug 24. When the regulator 10 is located in a hydraulic circuit, the supply passage 36 and vent passage 38 are fluidly connected to a supply fluid source and a venting location lower in pressure than the set point pressure of the regulator is present, respectively. Here, the supply passage 36 will typically be connected to a fitting such as an npt or other configuration fitting (not shown), allowing the fitting to be sealingly secured in the supply passage 36, and the fitting is connected to a supply of high pressure fluid maintained at a pressure higher than the regulated pressure set point of the regulator 10, and the vent passage 38 is open to the ambient surroundings of the pressure regulator 10, which in a subsea application, is seawater.

On a second rectangular face of the cuboid body 14, extending generally perpendicular to the first rectangular face, is provided an outlet plate 28. The outlet plate 28 includes a regulated fluid passage 42 extending therethrough. The regulated fluid passage 42 communicates, through an opening 30 through the outlet plate, with a regulated fluid volume 206 (FIG. 5) within the body 14 as will be described further herein. The regulated fluid passage 42 will typically be connected to a fitting such as an npt or other configuration fitting (not shown), allowing the fitting to be sealingly secured in the regulated fluid passage 42, and the fitting is connected to the regulated fluid portion of a hydraulic circuit (not shown) at a location thereof exterior to the cuboid body 14.

In this embodiment, the second functional plug 26 is located on a third face of the body 14 generally parallel to the first face, and it is a blind plug i.e., it has no openings thereinto or therethrough. A fourth face 30 of the body extending between the first and third faces into which plugs 24, 26 extend, forms a rectangular mounting wall of the body 14, and is configured for mounting the regulator 10 on a hydraulic circuit system rack or plate (not shown).

Figure 4:
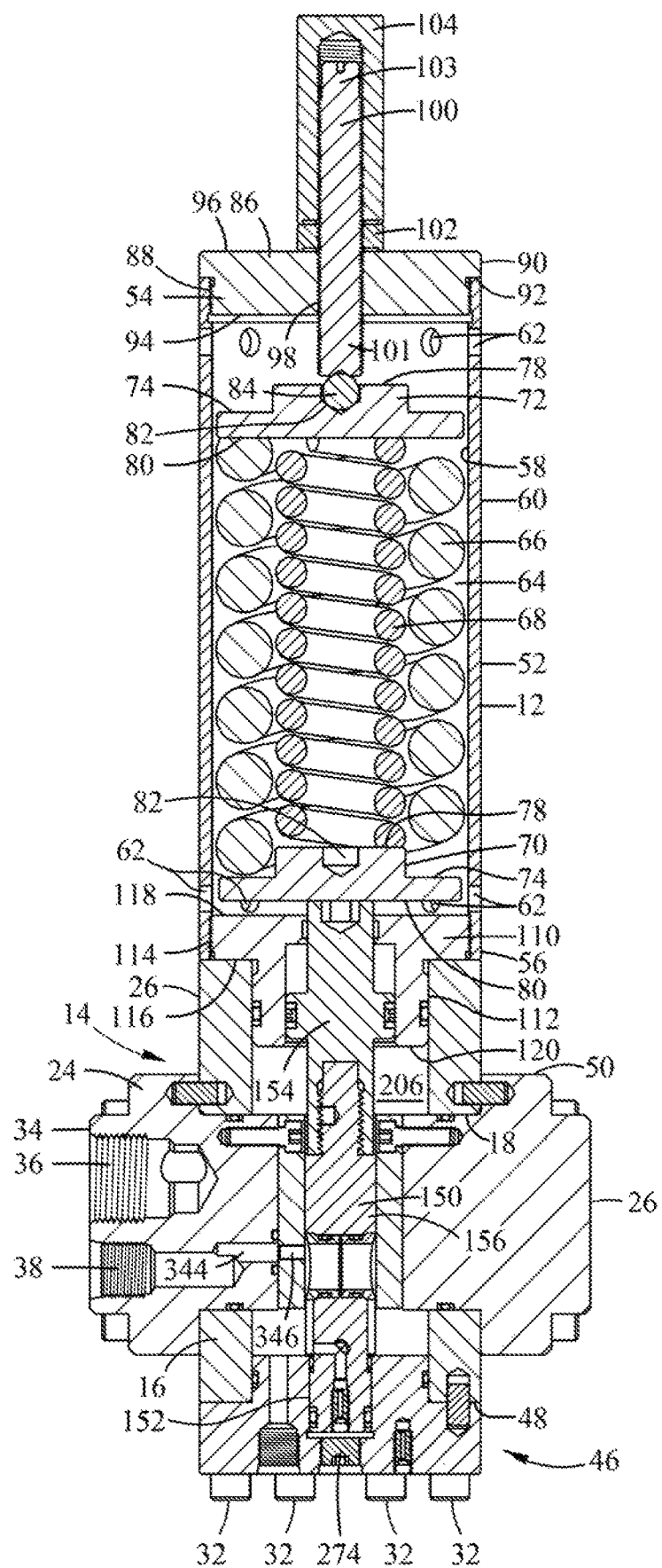
FIG. 4 is a sectional view of the regulator of FIG. 2 at section 4-4.
Figure 5:
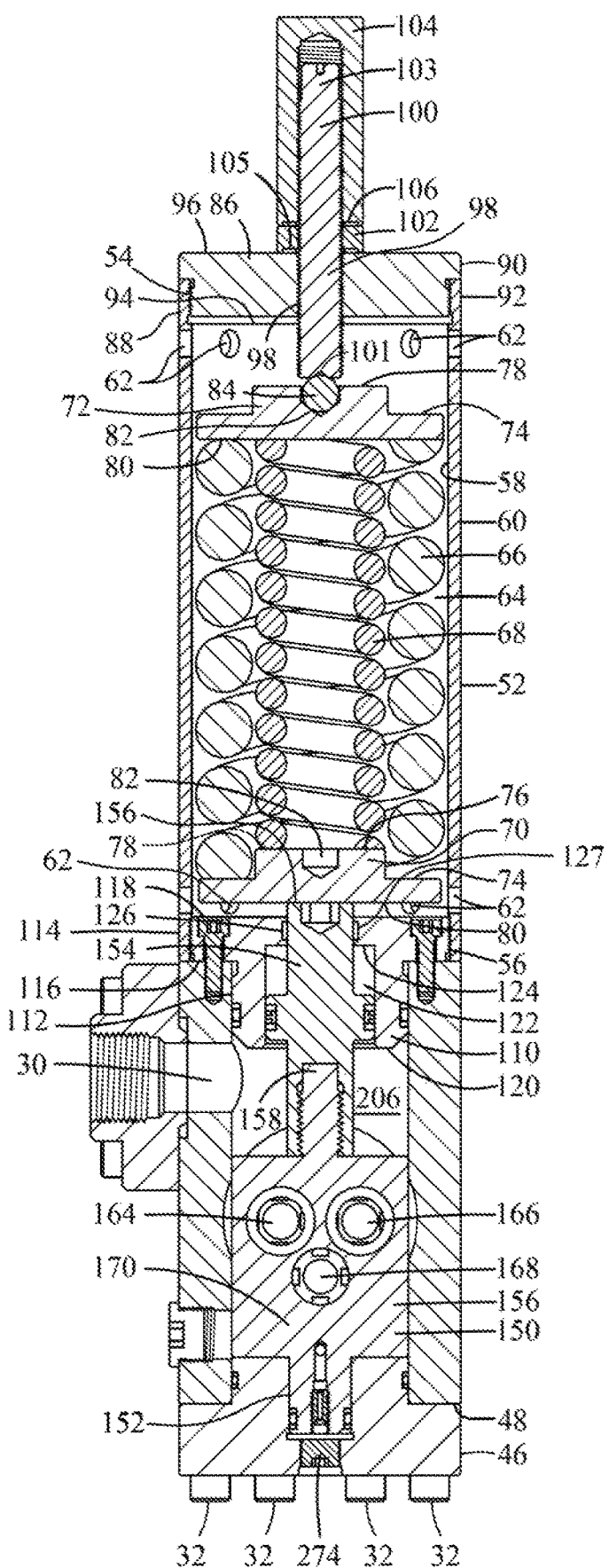
FIG. 5 is a sectional view of the regulator of FIG. 3 at section 5-5.

A third plug 46 is provided extending inwardly of the generally square lower surface 48 of the body facing away from the spring body receiving surface 50 thereof, from which the first to fourth faces of the body 14 extend in the direction of the spring housing 12. As will be described in more detail herein, the third plug 46 is configured to provide at least a portion of a dampening volume within which a dampening piston reciprocates, and to enable selective placement of dampening elements into the fluid circuit of the regulator 10 and thereby enable local, user selectable, dampening characteristics of the regulator 10 for a specific fluid regulating application. As shown in FIGS. 4 and 5, the third plug 46 is likewise partially received within a bore of the body 14 and secured by bolts 32 or other fasteners extending therethough and secured in threaded holes extending inwardly of body 14 at lower face 48 thereof.

Figures 2, 3:
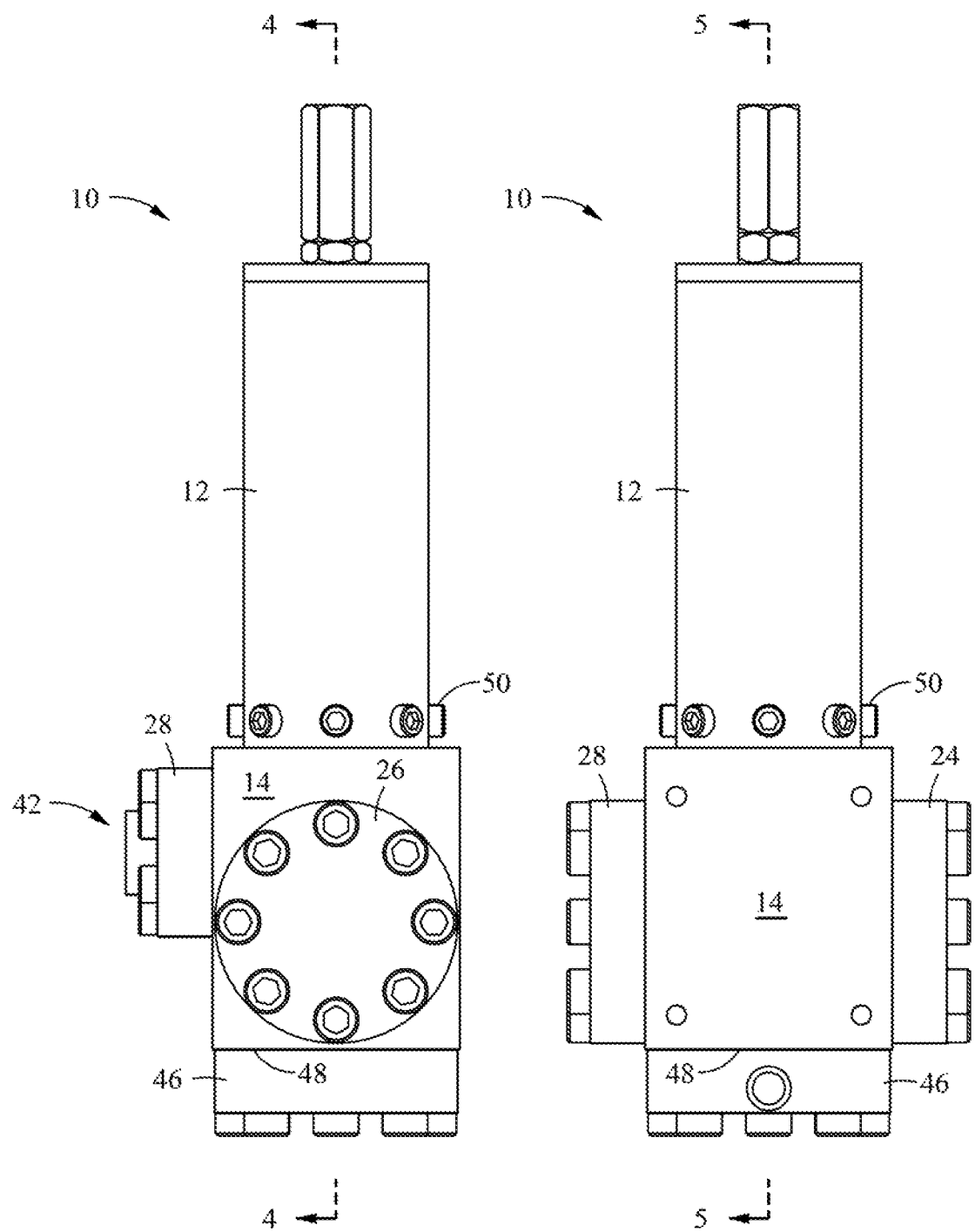
FIG. 2 is a side view of the regulator of FIG. 1.
FIG. 3 is an additional side view of the regulator of FIG. 1.

Referring now to FIGS. 4 and 5, the regulator 10 is shown in cutaway, showing details of the inner construction thereof, and of the connection of the spring housing 12 with the body 14. FIG. 4 is a cutaway view of the plan view of the regulator 10 of FIG. 2 at 4-4. FIG. 5 is a sectional view of the plan view of the regulator 10 of FIG. 3 at 5-5.

Spring body 12 hereof includes a thin walled tubular body 52 composed of, for example, stainless steel, and having opposed open ends 54, 56, a circumferential inner wall 58 surrounding an interior volume of the spring housing 12, and a circumferential outer wall 60, whereby spring components are circumferentially surrounded by the circumferential inner wall 58. A plurality of vent holes 62 extend through the tubular body 52, and are spaced apart around the circumference of the tubular body 52 at locations spaced inwardly of the opposed ends 54, 56 of the tubular body 52. A user variable biasing assembly 64 is partially provided within tubular body 52, and therein includes a major diameter coil spring 66, a minor diameter coil spring 68 disposed within the circumference of the major diameter coil spring 66, a spring piston 70 contacting a first end of each of the coil springs 66, 68 adjacent to the body 14, and a bias setting plate 72 contacting the opposed ends of each of the coil springs 66, 68. Each of the spring piston 70 and the bias plate 72 have an outer circumferential surface corresponding in shape to the inner wall 58 of the tubular body 52, and are slightly smaller in circumference than inner wall 58 and thus are both free to move linearly within tubular body 52. Spring piston 70 includes an outer annular support face 74 and a boss 78 extending from within the circumference of the annular support face 74 and therefrom inwardly of the tubular body 52. A first end of the major diameter coil 66 spring bears against the annular support face 74. A first end of the inner coil spring 68 bears against boss 78. A full face portion 80 is provided opposed to the annular support face 74 and boss 78, and is configured to contact a plunger extending from the body 14 of the regulator 10, as will be described herein.

The bias setting plate 72 has the same general configuration as the spring piston 70, but in use the full face portion 80 thereof bears against the second ends of the coil springs 66, 68, and a recess 82 extends inwardly of the boss 78. To reduce the number of individual different parts used in the regulator, the spring piston 70 may also include this recess 82, as shown in FIG. 4. A ball 84 is located in the recess 82 of bias setting plate 72.

At open end 54 of tubular body 52 is provided a guide plate 86 having a minor diameter outer circumferential wall 88 extending inwardly of the end 54 of tubular body 52, a major diameter outer circumferential wall 90 disposed outwardly of tubular body 52, an annular limit flange 92 extending between the minor diameter outer circumferential wall 88 and major diameter outer circumferential wall 90 and overlying the end 54 of the tubular body 52, a generally circular inner face 94 within the tubular body 52 facing the bias setting plate 72, and a generally circular outer face 96 facing away from inner face and located exterior to tubular body 52. The guide plate 86 is secured to the open end of tubular body 54 such as by providing threads on minor diameter outer circumferential wall 88 and mating threads inwardly of the open end 54 of tubular body, welding guide plate 86 to the open end 54 of tubular body 52, or other mechanisms. A threaded opening 98 extends through the guide plate 86 from outer surface 96 to inner surface 94 thereof, and is generally centered with respect to inner and outer surfaces 94, 96. A threaded bias rod 100 is threaded through the threaded opening and a first end 101 thereof extends inwardly of the tubular body 52 and contacts ball 84. The first end 101 may include a detent therein into which a portion of the ball 84 is received. The second end 103 of threaded rod 100 extends outwardly of the tubular body 52 and of outer face 96 of guide plate 86. A threaded nut 102 is provided over the threaded rod 100 on the portion thereof extending outwardly of the outer surface of guide plate 86. To adjust the extension of the first end 101 of threaded rod 100 inwardly of tubular body 52, the threaded rod 100 is rotated while the nut 102 is located in a backed away position from outer surface 96 of guide plate 86. When the desired position of the end 101 of threaded rod 100 inwardly of guide plate 86 is attained, the nut 102 is rotated and thereby tightened on threaded rod 100 to bear against the outer surface 96 of the guide plate 86, thereby locking the threaded rod 100 in position. The threaded rod 100 position can be easily changed by backing off the nut 102, turning threaded rod 100 clockwise or counter clockwise, and re-securing nut 102 to bear against the outer surface 96 of guide plate 86. A protective cap 104 is threaded over the portion of threaded nut 100 extending outwardly of nut 102 on the exterior of the guide plate 86. Each of the cap 104 and the nut 102 include a seal 105, 106 (FIG. 5) extending inwardly of the spring facing surface of the cap 104 and the nut 102.

The end 101 of the threaded rod 100 bears against ball 84, which serves as a bearing between the end 101 of threaded rod 100 and the bias setting plate 72, which allows the bias setting plate to, when needed, tilt slightly on the ends of springs 66, 68, and the extension of the end 101 of threaded rod 100 inwardly of the guide plate 86 dictates the position of bias setting plate 72 within tubular housing, and thus the minimum compression of the coil springs 66, 68 therein. Contact between the ball 84 and end 101 of threaded rod 100 is maintained by the outward bias of springs 66, 68 tending to push bias setting plate 72 and thus ball 84, in the direction of upper open end 54 of tube 52.

Figure 6:
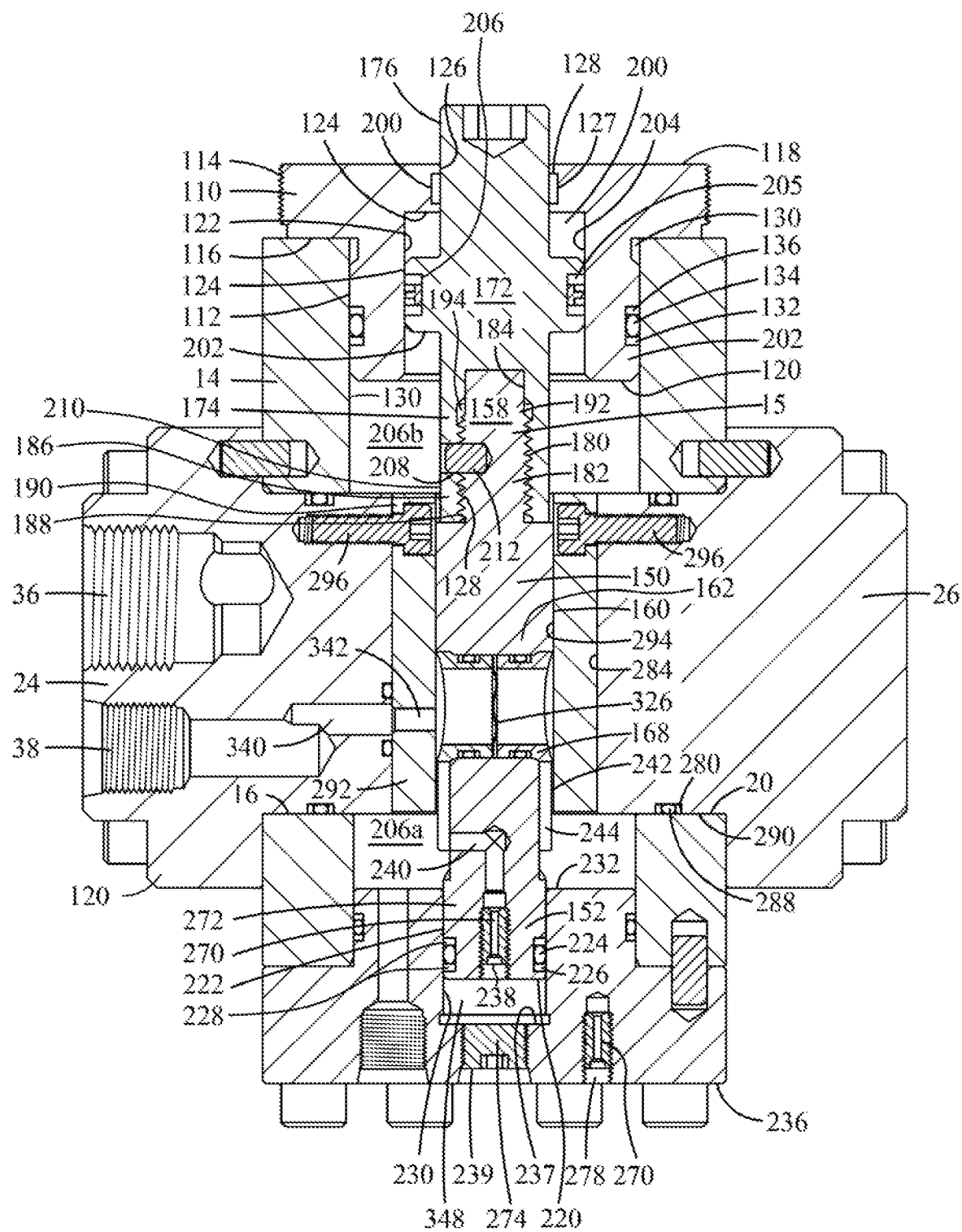
FIG. 6 is an enlarged sectional view of the body of the regulator of FIG. 4.

At the lower open end 56 of tubular body 52 is provided a piston guide plate 110. Referring to FIG. 6 for ease of understanding, piston guide plate 110 includes a minor diameter outer surface 112, a threaded major diameter outer surface 114, an annular limit wall 116 extending therebetween, a spring facing surface 118 and a regulated fluid facing surface 120. A first piston bore 122 extends inwardly of regulated fluid facing surface 120, and terminates at an annular piston limit ledge 124, from which a plunger guide bore 126 extends through the spring facing surface 118. A packer recess 127, within which a sealing packer 128 is located, extends inwardly of plunger guide bore 126, inwardly spaced from annular piston limit ledge 124 and spring facing surface 118. Referring to FIGS. 4 and 5, the inner surface 58 of tubular body 52 at open end 56 is threaded over threads on major diameter outer surface 114 to secure tubular body thereto. The minor diameter outer surface 112 of piston guide plate 110 extends inwardly of spring side bore 130 of body 14, and the piston guide plate 110 is secured to the body 14 such as by fasteners, (FIG. 5) extending through the piston guide plate 110 between spring facing surface 118 and annular limit wall 116 and thence into mating threaded holes in the body 14. Minor diameter outer surface 112 includes extending therein between annular limit wall 116 and regulated fluid facing surface 120 a seal recess 132 within which are located a seal ring 136 bounded by opposed back up rings 134. The seal ring 136 seals between the bottom of the seal recess 132 and the inner wall of the spring guide bore 130 of the body 14.

As shown in FIGS. 4 to 6, body 14 is configured to retain hydraulically operable components, including a seal carrier plate 150 integrally including at an end thereof distal of the spring housing 14 a dampening piston 152, and connected at the other end thereof to a plunger 154 extending therefrom into contact with the spring piston 70 bearing against the end thereof. Herein, seal carrier plate 150 is configured as a generally rectangular plate formed as a gate 156 from which extend the generally right cylindrical, in section, dampening piston 152, and at the opposite end of the gate 156, a plunger boss 158, likewise generally right cylindrical in section. The opposed large rectangular faces 160, 162 of gate 156 are pierced by three openings extending through the gate 156, two, side by side, supply seal openings 164, 166 and a vent seal opening 168. The center of the vent seal opening 168 lies along a center line 170 of both the plunger boss 158 and the dampening piston 152, and the vent seal opening 168 extends through the gate 156 at a position between the side by side supply seal openings 164, 166 and the dampening piston 152.

Referring to FIG. 6 for detail, plunger 154 is a configured as a generally right cylindrical stem including therein a circumferential annular piston 172 slidably located within piston bore 122, a connecting stem 174 extending therefrom in the direction of the gate 156, and a guide stem 176 extending from the piston 172 in the direction of the spring housing 12. Connecting stem 174 includes a first bore 178 extending inwardly of the distal end thereof, a second bore 180 having a smaller diameter than first bore 178 extending inwardly of the connecting stem 174 from the first bore 178, an annular ledge 182 extending between the first bore 178 and second bore 180, and a counterbore 184 extending inwardly of connecting stem 174 from second bore 180. Plunger boss 158 has a generally right cylindrical outer profile including an undercut portion 188, a circumferential boss 190, a pin stem 192 extending therefrom and a pilot boss 194 extending from the pin stem 192. Pilot boss 194 is received in counterbore 184, and one side of the circumferential boss 194 bears against the annular ledge 182, to limit the extension of the plunger boss 158 thereinto. The circumferential piston 172 includes opposed annular faces 200, 202 bounding opposed ends of a circumferential guide face 204 into which, and spaced from annular faces 200, 202, extends a circumferential seal groove 205 within which a seal ring and opposed back up rings are located. The seal ring in seal groove 205 seals between the base of groove 204 and the facing surface of the first piston bore 122. Annular face 204 faces the regulated fluid volume 206 of the body 14. A spring loaded pin 208 received in a pin bore 212 extending inwardly of pin stem 192 also extends therefrom into a locking pin recess 210 extending inwardly of second bode 180 to lock the plunger 154 to the plunger boss 158. Guide stem 158 of plunger 154 extends through plunger guide bore 126, and slides through packer 128 such that the spring piston 154 bears against the end 156 thereof. Plunger 154 includes the circumferential annular piston 172, which, biased by the regulated fluid pressure in the regulated fluid volume 206, tends to push the plunger 154 in the direction of the spring housing 12. The centerline of piston bore 122 is centered on center line 170 and also serves to align the end of the seal carrier plate 150 adjacent to the spring housing 12 within body 14.

Dampening piston 152, in this configuration, is provided as an integral extension of seal carrier plate 150, but may also be a separate element connected to seal carrier plate 150 in a similar fashion as is plunger 154. Dampening piston 152 herein is generally right cylindrical in section, and includes therein a lower circular wall 220, an outer circumferential surface 222 extending from circular wall to the gate 156 portion of the seal carrier plate 150, and includes a seal recess 224 extending therein between lower circular wall 220 and gate 156. The dampening piston 152 extends inwardly of a dampening bore 230 extending into the gate facing surface 232 of third plug 46. A threaded bore 234 extends from dampening bore 230 to the outer surface 236 of third plug 46. A seal ring 226, bounded by opposed back up rings 228, is located in seal recess, whereby seal ring 226 seals between the base of seal recess 224 and the dampening bore 230. The centerline of dampening bore 230 is centered on center line 170, and dampening bore 232 also provides an alignment function to align the center of dampening piston 152 along centerline 170. An annular limit ledge 237 extends between the threaded bore 234 and the dampening bore 230. An orifice access plug 274 is releasably threaded into the threaded bore 234.

An orifice bore 238 extends inwardly of dampening piston 152 from circular wall 220, and generally extends along the center line 170, and terminates inwardly of the dampening piston 152 at a cross bore 240 extending generally perpendicular to orifice bore 238, which opens into the connecting location of the circumferential wall 222 of the dampening piston 152 and the gate 156. Gate 156 includes recesses 242, 244 extending inwardly of the opposed large rectangular faces 160, 162 thereof into which the cross bore opens. Orifice bore 238 includes a threaded portion, into which a removable and replaceable orifice plug 270 is threaded. Orifice plug 270 includes an extended through bore 272 extending therethrough to form a restrictive flow path between opposed ends of the orifice bore 238. The dampening properties of the regulator 10 are selected by selecting an orifice plug 270 having a through bore 272 which provides a flow restriction through the orifice bore 238 which will provide the desired dampening property of the regulator 10. A plurality of orifice plugs 270 having different through bore 272 diameters, and thus different extended orifices provided by the different through bore 272 diameters, are provided in blind threaded storage bores 278 extending inwardly of the outer surface 236 of fifth plug 46.

Referring to FIGS. 4 and 6, first plug 24 and second plug 28 are generally circular in section, and each includes an enlarged head portion 280, a boss 282 extending inwardly of the corresponding opening 16 or 20 into body 14, and terminating in a generally circular end face 284. A seal recess 286, having a seal ring 288 bounded by opposed rings 290 extends inwardly of the boss 282 around the circumference thereof, to seal between the base of the recess 286 and the corresponding opening 16, 20 in body 14. A seal bearing plate 292 having a generally circular cross section is mounted to the circular end faces 284. Seal bearing plate 292 provides a surface more wear resistant than the material of the functional plugs 24, 26, and is configured of a material such as carbide or sapphire. Each seal bearing plate 292 includes an inwardly facing sealing surface 294, as is attached to the corresponding circular end face with a plurality of fasteners 296 extending therethrough and into corresponding threaded recesses extending inwardly in the circular end face 284.

Figure 7:
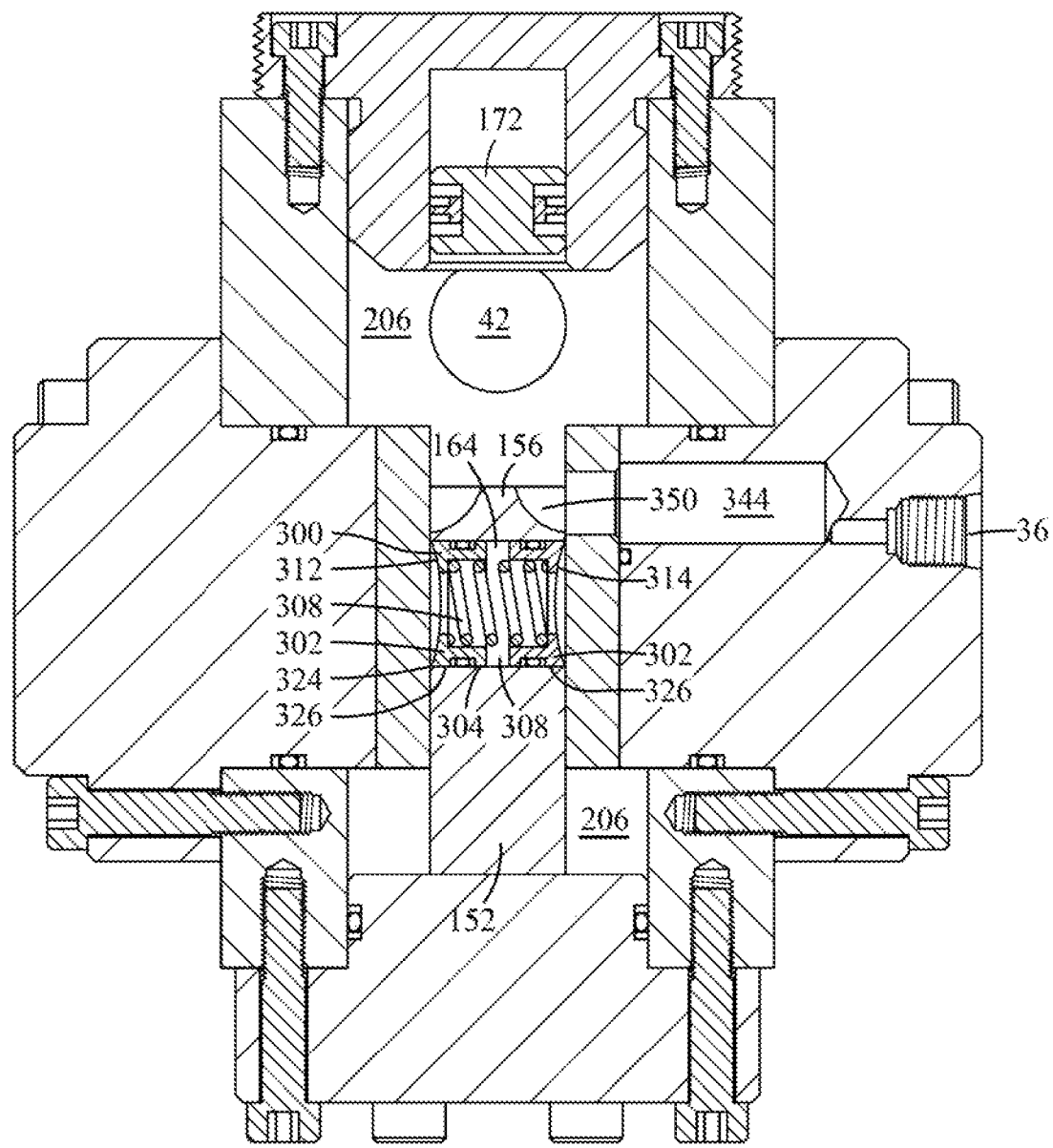
FIG. 7 is an enlarged sectional view of the body of the regulator of FIG. 5.

Referring to FIGS. 6 and 7, each of supply seal openings 164, 166 and a vent seal opening 168 extending through the gate 156 include a seal structure 300 therein. For clarity, the seal structure 300 in supply opening 164 is described in detail with reference to FIG. 7, and each of the seal structures 300 in the supply seal openings 164, 166, and a vent seal opening 168 have the same structure, except as where noted herein. Each seal structure 300 includes a pair of seal sleeves 302 configured as generally right cylindrical annular members having an inner counterbore 304 extending from a first annular face 306 inwardly thereof and terminating at an annular ledge 308 extending inwardly toward the center of the sleeve 302. A second annular face 310 of the sleeve includes a recess 312 terminating at an outer thin wall extending sealing lip 324. The first annular faces 304 of the pair of seal sleeves 302 face each other, and are spaced apart by a spring. In supply passages 164, 166, the spring comprises a coil spring 314 extending inwardly of the facing counterbores 304 and bearing against the facing annular ledges 308 to bias the seal sleeves away from each other, and push the sealing lips 324 thereof into engagement with the pair of opposed sealing faces 294. Extending inwardly of the outer circumferential surface 326 which extends from the distal end of sealing lip 324 to first annular face 306 includes a circumferential seal recess 330, within which a seal ring 332 and opposed backing rings 324 are provided. Seal ring 332 seals against the base of recess 330 and the bore of the supply and vent openings 164, 166, and 168. In the seal structure 300 of the vent passage, a circular wave spring 326 (FIG. 6) is located between the opposed first annular faces 304 to bias the seal sleeves 302 away from each other and the sealing lips 324 thereof against the opposed sealing faces 294.

Referring to FIG. 6, vent passage 38 extends from the outer face 34 of the first functional plug 24 to an offset passage 340 having a smaller diameter than vent passage 34, and terminating at terminal end face 284 of first functional plug 24. A corresponding passage 342 extends through the seal bearing plate 292 on end face 284 of first functional plug 24 in alignment with offset passage 340. Referring to FIG. 4, vent passage 38 extends from the outer face 34 of the first functional plug 24 to a pair of offset supply passages 344 (only one shown) offset side to side with the same spacing between the centers thereof as the corresponding supply openings 164, 166 in the gate 156, and having a smaller diameter than supply passage 34, and terminating at terminal end face 284 of first functional plug 24. Corresponding passages 346 (only one shown) extends through the seal bearing plate 292 on end face 284 of first functional plug 24 in alignment with offset passage 344.

During use, the supply passage 36 is connected to a supply of fluid at a pressure exceeding the intended regulated pressure of the regulator 10, the vent passage 38 is fluidly connected to the surrounding ambient, and the regulated fluid passage 42 is connected to a hydraulic circuit the pressure of which can fluctuate. The springs 66, 68 are compressed by turning the threaded rod 100 to position the bias setting plate 72 inwardly of the tubular housing 52 at a position where the resulting force of the springs 66, 68 on spring piston 70 tending to push the plunger inwardly of the regulated fluid volume 206 of the body 14 is balanced by the force generated by the regulated fluid pressure in the regulated fluid volume 206 on the annular face 202 of the plunger 154 pushing the spring plate 70 away from the body 14 at the desired set point pressure. At this rest condition, one of each of the supply openings 164, 166 is centered with respect to the one of the offset supply passages 344, and the vent opening 168 is centered with respect to the offset passage 342. Because the surface area of the sealing lips 324 contacting the seal carrier plate s 292 of each seal sleeve is smaller than the combined surface area of the first annular face 306 and annular ledge 308, the pressure in the supply passage 36, which is greater than the regulated pressure present in the regulated fluid volume 206, urges the seal sleeves 302 apart and thus provides greater sealing pressure of the sealing lips 324 against the sealing faces 294. A wave spring 326 between the seal sleeves 302 in the vent opening 168 urges the opposed lips 324 in the vent opening against the sealing faces 294. The seal carrier plate 150 and plunger 154 in this rest condition are positioned as shown in FIG. 6.

In this condition, the lower circular wall 220 of the dampening piston 252 is spaced from annular limit ledge 237, and variable dampening volume 348 bounded by the surfaces of the dampening bore 230, the lower circular wall 220 and the plug 272 likewise includes fluid at the regulated pressure, as do the orifice bore 238, the cross bore 240 and the through bore 272 of the orifice plug 270.

The ends of the first and second functional plugs 24, 26 extend inwardly of the wall of the body 14 and thus into the regulated fluid volume 206, and the regulated fluid volume 206 surrounds the outer circumference of the portions of the first and second functional plugs 24, 26 extending inwardly of the wall of the body 14 such that a lower portion 206a and an upper portion 206b of the regulated fluid volume 206 are in fluid communication around the sides of the ends of the first and second functional plugs 24, 26 extend inwardly of the wall of the body 14. A dampening volume 348 is provided within the dampening bore 230 between the annular limit ledge 237 and the plug 274 on the one hand, and the base of the lower circular face 220 of the dampening piston 152. The only fluid communication between the variable dampening volume 348 and the regulated fluid volume 206 is through the through the through bore 272 in the orifice plug 270.

If the pressure in the regulated fluid volume 206 falls below the set point pressure, the force generated by the regulated fluid pressure in the regulated fluid volume 206 on the annular face 202 of the plunger 154 pushing the spring plate 70 away from the body 14 is reduced, and the springs 66, 68 urge the spring plate 70 against the plunger 154 pushing the plunger inwardly of the body 14, with the maximum movement of the plunger 154 as a result of the low pressure condition shown in FIG. 5, wherein the offset passages 344 at supply pressure become exposed to the regulated fluid pressure volume 206 as shown in FIG. 7. As also shown in FIG. 7, scoop shaped scallops 350 are provided inwardly the sides of gate 156 to allow fluid to communicate between the supply passage 36 and the regulated fluid volume 206 in this condition. In FIG. 7, the gate 156 has moved to its fully retracted position opening the entire cross section of corresponding passages 346 (only one shown) to communication with the regulated fluid volume 206.

As the pressure in the regulated fluid volume 206 falls below the set point pressure, and the force generated by the regulated fluid pressure in the regulated fluid volume 206 on the annular face 202 of the plunger 154 pushing the spring plate 70 away from the body 14 is reduced, and the springs 66, 68 urge the spring plate 70 against the plunger 154 to push the plunger inwardly of the body 14, fluid in the variable dampening volume 348 is compressed and the pressure thereof is increased, providing a counterforce to the force tending to push the plunger 154 inwardly of the body 14. Thus the pressure in the variable dampening volume 348 is increased, and because flow of fluid from the variable dampening volume 348 is restricted through the through bore 272 of orifice plug 270 in communication with the regulated fluid volume 206, the pressure thereof does not significantly fall when the pressure in the regulated fluid volume falls. This pressure provides a counterforce, the magnitude of which is a function of the back pressure required to push the fluid therein through the through bore 272 of the orifice plug 270, thereby preventing rapid movement of the plunger 154 inwardly of the body 14. If the force tending to push the plunger 154 inwardly of the body 14 is maintained, the higher pressure fluid in the dampening volume 348 continues to flow outwardly thereof through the through bore 272 in the orifice plug 270 and into the orifice bore 238, cross bore 240, and into the regulated fluid volume 206. The greater the pressure drop in the regulated fluid volume 206, and the longer it is maintained, the further the dampening piston 152 will move inwardly of the dampening bore 230, the movement limited only by the lower circular face 220 thereof engaging against the annular limit ledge 237 limiting further movement thereof away from spring housing 12. When the gate 154 positions the supply openings as shown in FIG. 7, the lower circular face 220 is engaged against the annular limit ledge 237 of FIG. 6. If a smaller pressure drop in the regulated fluid occurs, the travel of the dampening piston 152 inwardly of dampening bore 230 will be less, but because of the scallops 350, the supply passage 36 and the regulated fluid volume 206 can still be in communication with one another.

As the pressure in the regulated fluid volume 206 is increased by exposure to the higher pressure fluid of the supply passage 36, the force generated by the regulated fluid pressure in the regulated fluid volume 206 on the annular face 202 of the plunger 154 pushing the spring plate 70 away from the body 14 increases, and when a certain pressure in the regulated fluid volume 206 is reached, this force causes the springs 66, 68 to be compressed by movement of the plunger in the direction outwardly of the body 14. As this occurs, the dampening piston 15 dampens the motion of the plunger as pulling of the dampening piston 152 outwardly of the dampening bore 220 decreases the pressure in variable dampening volume 348, providing a suction effect tending to pull on the spring plate 150. This suction effect is maintained as the now higher fluid pressure in the regulated fluid volume moves back through the cross passage 240, orifice plug passage 238, and the through passage 272 of the orifice plug 270 and into the dampening volume 348 until the pressures of the dampening volume 348 and the regulated fluid volume 206 are equalized. As a result, the movement of the gate 156 of the spring plate 150 in the direction of the spring housing 12 to close of the communication of the supply pressure in the passages 344 from the regulated fluid volume 206 is less likely to overshoot the closed position. If overshooting were to occur, the plunger 154 movement would compresses the springs 66, 68 to a compression state greater than that which can be maintained by the force generated by the regulated fluid pressure in the regulated fluid volume 206 on the annular face 202 of the plunger 154 pushing the spring plate 70 away from the body 14, the springs 66, 68 will again cause the plunger to move inwardly of the body 14, and expose the supply pressure of the regulated fluid volume. This cycle can repeat, resulting in valve chatter and an unstable, oscillating pressure in the regulated fluid volume 206. The dampening effect of the fluid passing through the orifice plug 270 reduces the moving speed of the gate 154, and thus rate at which supply pressure is supplied to the regulated fluid volume, and the difference in pressure when cut off from communication with the regulated fluid volume, reducing the likelihood of chatter.

In the event of an increase in pressure in the regulated fluid volume 206, the force generated by the regulated fluid pressure in the regulated fluid volume 206 on the annular face 202 of the plunger 154 pushing the spring plate 70 away from the body 14 is increased, causing the plunger 154 to push the seal carrier plate 170 away from the body 14 and further compress the springs 66, 68. As this occurs, the gate 156 moves in the direction of the spring housing 12, causing the vent opening 156 therethrough to align with the vent passage 38, and the pressure in the regulated fluid volume 206 is relieved through the vent passage 38. Again, once the pressure in the regulated fluid volume 206 begins falling, the force generated by the regulated fluid pressure in the regulated fluid volume 206 on the annular face 202 of the plunger 154 pushing the spring plate 70 away from the body 14 falls, and the gate 154 moves in the direction away from the spring housing 12 to close off communication between the regulated fluid volume 206 and the vent passage 38. Likewise, as the gate 154 is urged in the direction of the spring housing 1, the variable dampening volume 348 provides a suction force as the pressure therein is below that of the now increased pressure in the regulated fluid volume 206, and this suction is ameliorated by flow of the higher regulated fluid through the cross passage 240, orifice plug passage 238 and the through opening 272 in the orifice plug 270 into the variable dampening volume 348, thus reducing the movement speed, and likelihood of overshoot, of the gate 154 as it opens communication to the vent passage, and likewise dampens the motion of the gate 154 away from the spring housing 12 while the pressure in the variable dampening passage is reduced by fluid flow therefrom through the through opening 272, orifice plug passage 238 and cross passage 240.

The diameter and length of the through opening 272 in the orifice plug 270 thus defines the dampening characteristics of the regulator 10. The required dampening characteristics are typically application dependent, and often not calculable but sometimes must be determined by trial and error. If the movement of the gate 154 is too slow as a result of being overdampened for the system requirements, pressure increases that damage components in the hydraulic circuit, the pressure of which the regulator 10 is regulating, can occur. If the movement of the gate 154 is too fast as a result of being underdampened for the system requirements, the gate 154 will overshoot, resulting in an undesirable pressure oscillation in the regulated pressure, and chatter or gate cycling resulting in rear and a reduced lifetime of the regulator. In the prior art, if these conditions were encountered as a result of improper dampening, the entire regulator would need to be removed and replaced in situ. Here, if the dampening is not as desired, a different orifice plug having a greater flow rate therethrough if the regulator is overdamping, or a different orifice plug having a lesser flow rate therethrough if the regulator is underdamping, is switched for the current orifice plug by removing the plug 274 thereby providing access to the variable dampening volume 348, removing the existing orifice plug 270 by turning it to unthread it from the orifice bore 238 and remove it through the opening from which plug 274 was removed, and replacing it by extending the appropriate orifice plug 270 through the opening and threading it into the orifice passage 238 to provide the desired dampening characteristics in the regulator 10, followed by sealing off the variable dampening volume 348 by replacing the plug 274. The outer end of the orifice plug 274 includes a flatted recess therein, for example a recess having a hexagonal flatted inner surface, into which the end of a hex head wrench can be extended to remove or place an orifice plug into the threaded orifice passage 238.

Figure 8:
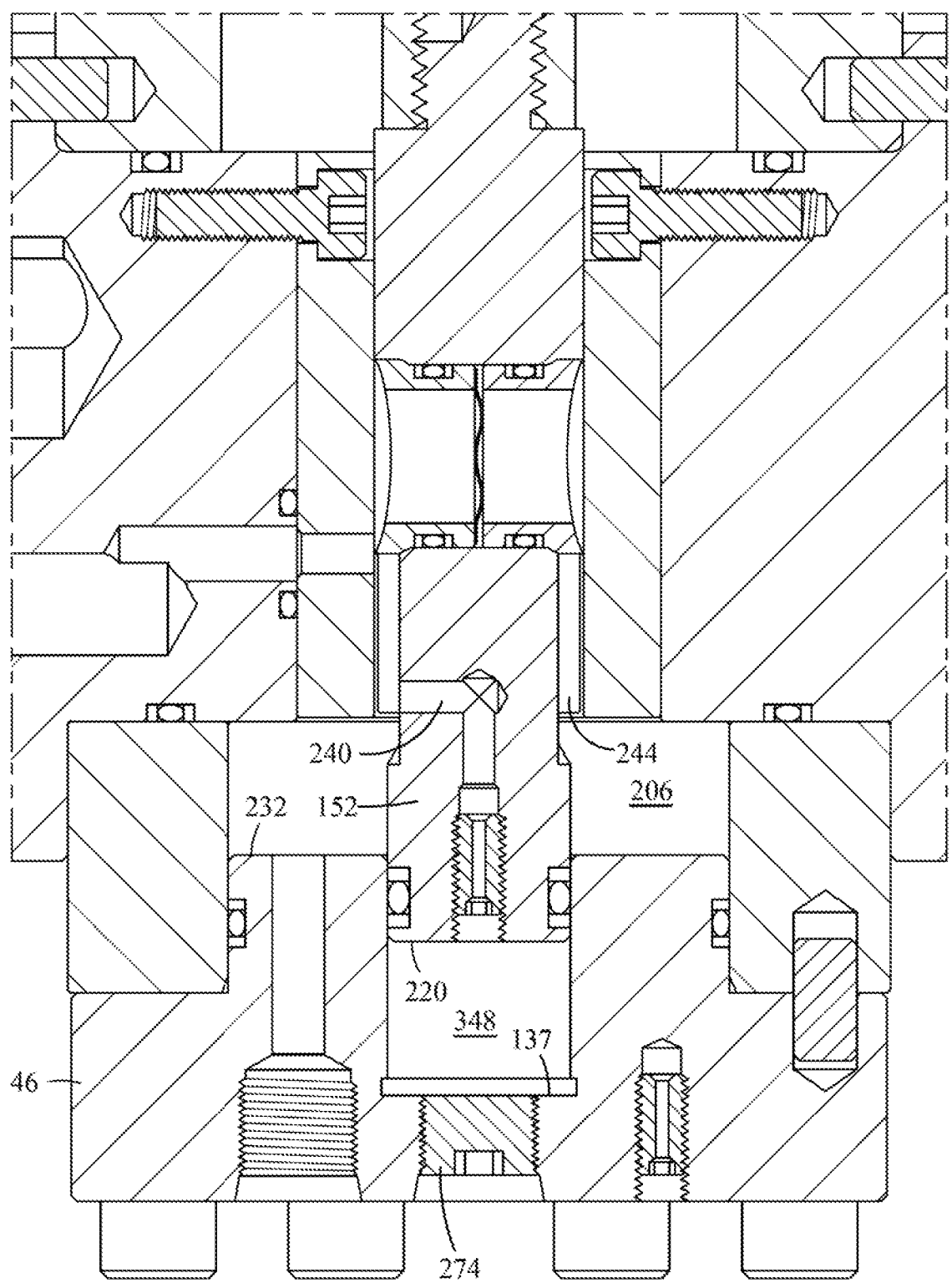
FIG. 8 is a further enlarged sectional view of the body of the regulator of FIG. 4.
Figure 9:
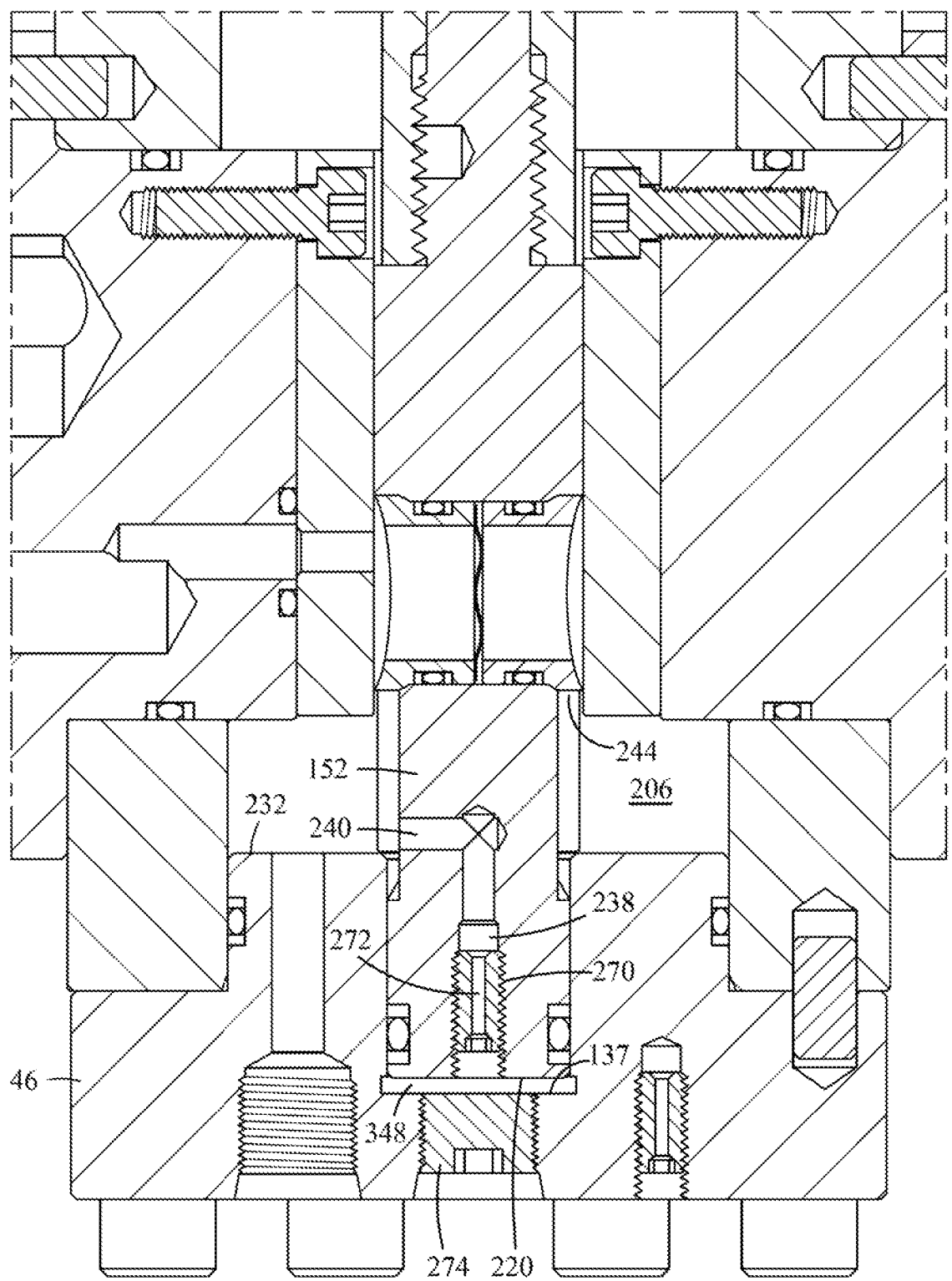
FIG. 9 is a further enlarged sectional view of the body of the regulator of FIG. 5.

Referring to FIGS. 8 and 9, the portion of the regulator 10 comprising the variable dampening volume 348 is shown. In FIG. 9, where the regulated fluid volume 206 is maximally overpressured, and the gate is positioned whereby the vent passage 38 is fully exposed to the regulated fluid volume 206, the lower circular wall 220 of the dampening piston 152 is slightly spaced from the annular wall 137, and the cross passage 240 is located such that the lowermost portion thereof is collinear with the gate facing surface 232 of third plug 46, and thus is fully exposed to the regulated fluid volume 206. In FIG. 8, where the regulated fluid volume 206 is maximally underpressured, the lower circular wall 220 of the dampening piston 152 is maximally spaced from the annular wall 137, and the cross passage 240 is located such that the lowermost portion thereof is collinear with the lowermost surface of the seal bearing plate, but the opening thereof opens into the recess 244, and thus is fully exposed to the regulated fluid volume 206. When the pressure in the regulated fluid volume 206 is in an acceptable range, the lower circular wall 220 of the dampening piston 152, and the outlet of the cross passage 240, are located midway the positions thereof shown in FIGS. 8 and 9.

Figure 10:
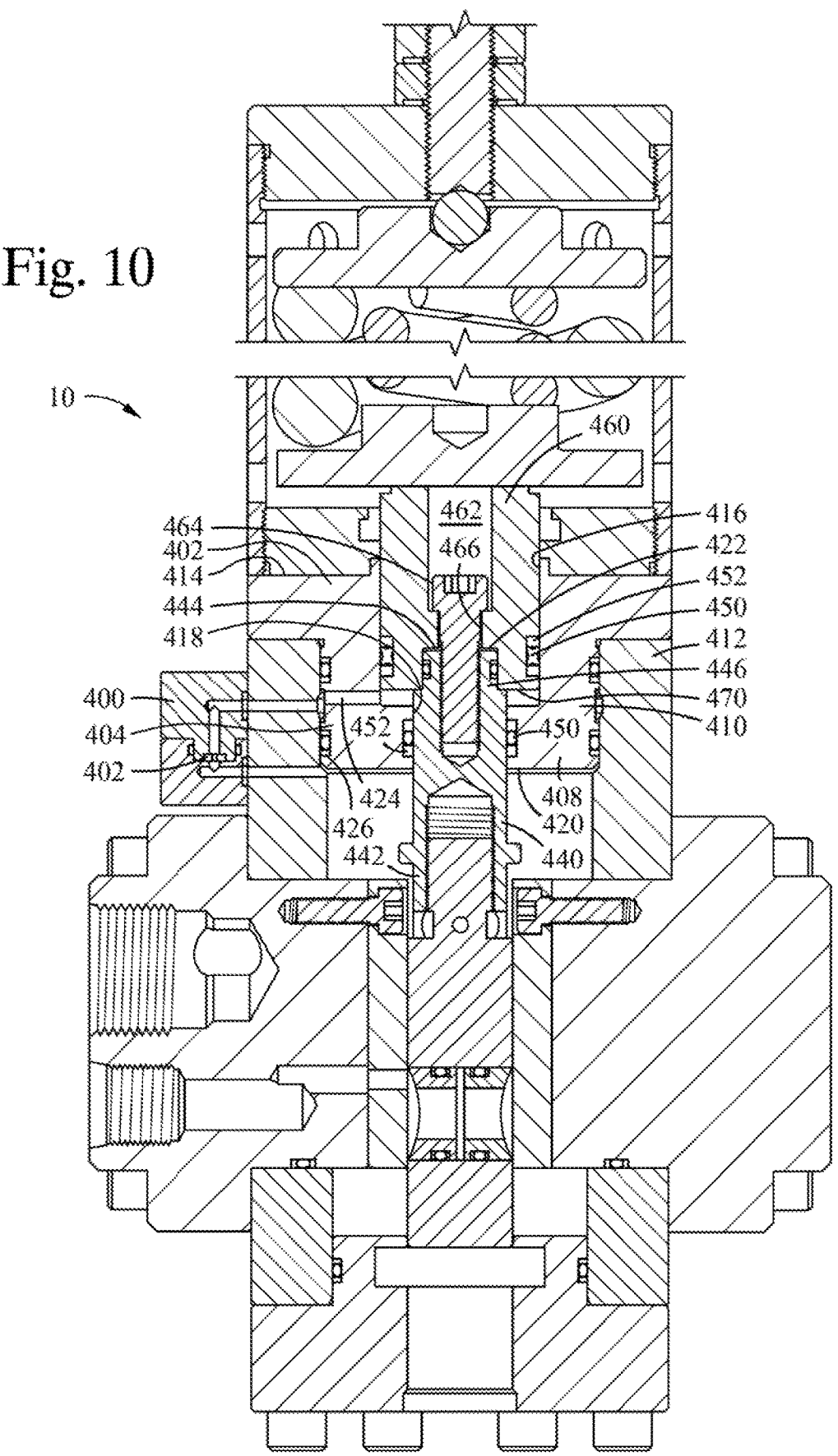
FIG. 10 is a sectional view of an alternative construct of the regulator of FIG. 1.
Figure 11:
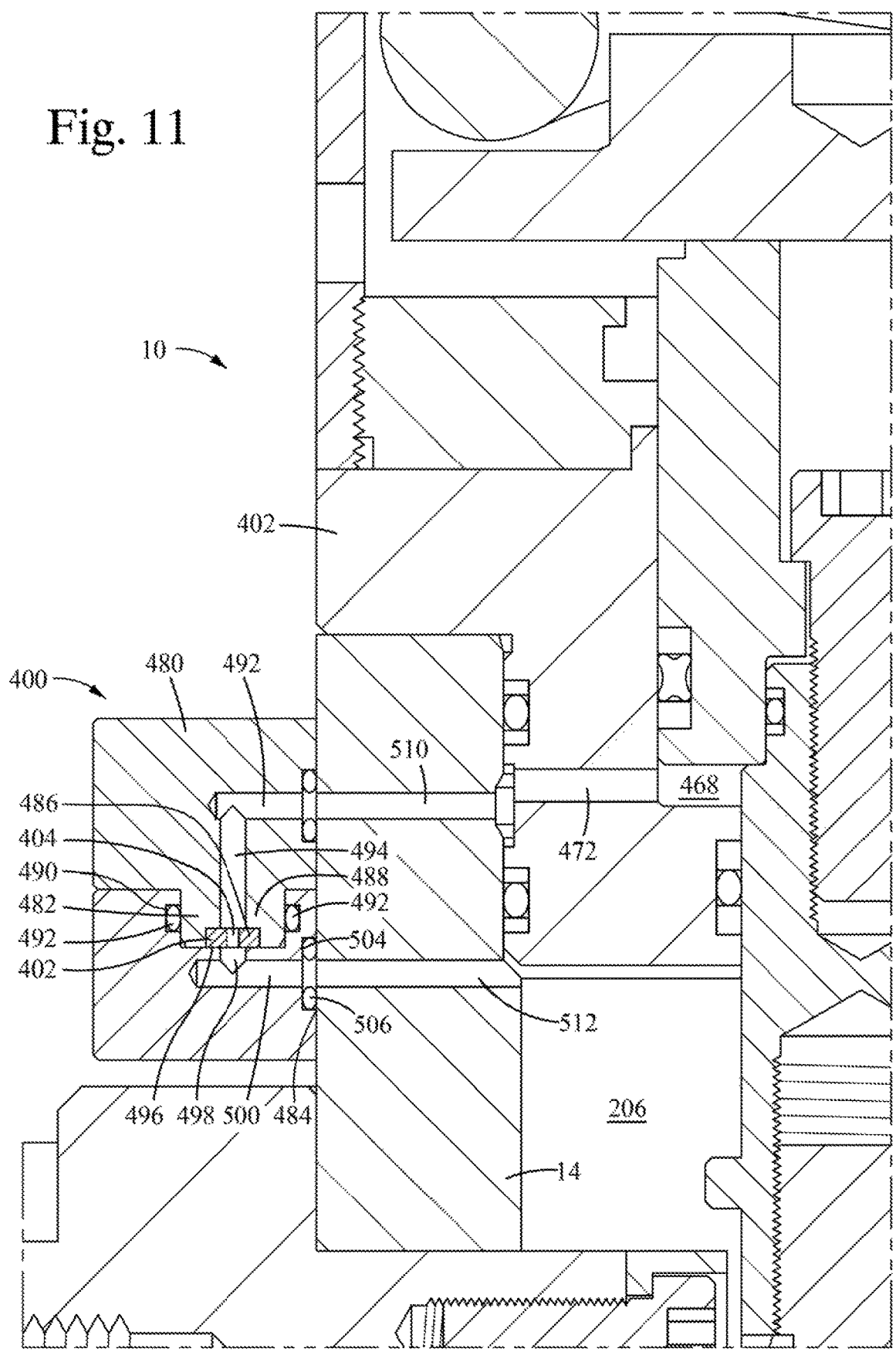
FIG. 11 is an enlarged sectional view of a dampening adaptor of the regulator of FIG. 10, with the piston thereof in a first position.
Figure 12:
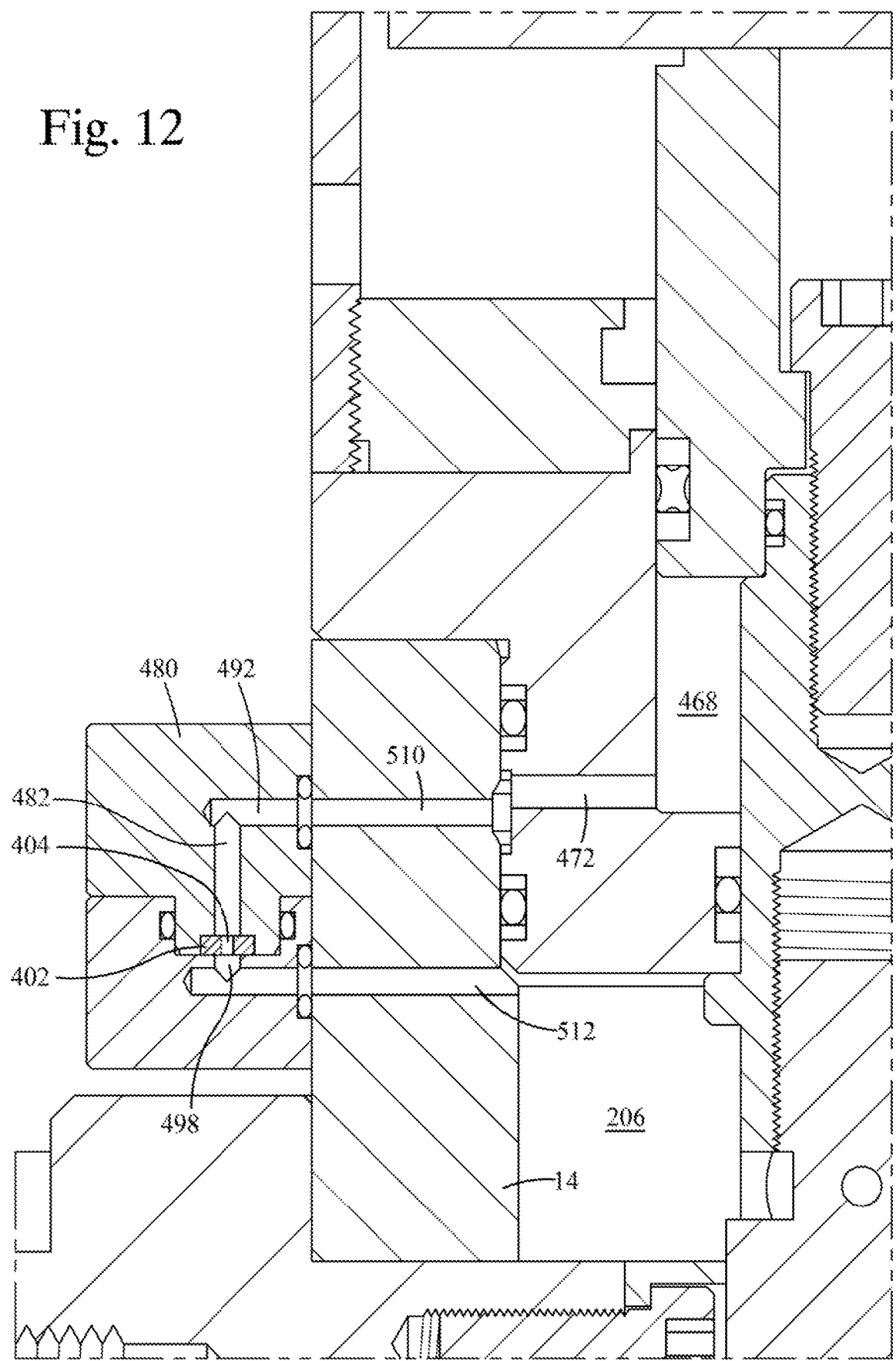
FIG. 12 is an enlarged sectional view of a dampening adaptor of the regulator of FIG. 10, with the piston thereof in a second position.

Referring now to FIGS. 10 to 12, an alternative regulator 10 having user selectable dampening properties is shown. In this embodiment, the dampening piston 152, orifice passage 238 and cross passage 240, and orifice plug 270 are replaced with a removable dampening housing 400 located on the exterior of the regulator 10, within which a user selectable dampening disk 402 having a specific size orifice 404 is replaceably located. Additionally, the structure of the piston guide plate 110 and the plunger 154 are modified as compared to the structure of FIGS. 1 to 9.

In this embodiment, as compared to the regulator 10 of FIGS. 1 to 9, the piston guide plate 402 includes a first, piloted portion 404 and a second, guide portion 406 disposed between piloted portion 402 and the spring piston 70 in the spring housing 12. Piloted portion 404 includes a minor diameter boss 408, extending inwardly of the upper bore 410 of the body 14, an annular lower face 412 which bears against the upper end of body 14, an upper annular face 414 facing the spring housing 12, a major diameter bore 416 extending inwardly of the upper annular face 414, and a minor diameter bore 418 extending from the terminus of the major diameter bore 416 inwardly of the piston guide plate 402 to a lower annular face 420 of the piston guide plate 402. An annular ledge 422 extends between the terminus of major diameter bore 416 inwardly of the piston guide plate 402 and the minor diameter bore 418. A cross bore 424 extends through the piston guide plate 402 from a location slightly inwardly of the major diameter bore 416 from the annular ledge to outer surface 426 of the minor diameter boss 408.

In contrast to the first embodiment, the modified plunger assembly 440 is provided. The plunger assembly includes a lower extension portion 442 configured to connect to the upper end of the gate 150 in the same manner as does plunger 154, and which extends through the minor diameter bore 418 of the piston guide plate 402, and there includes an extending circular boss 444. The upper end of boss 444 includes a threaded bore 446 extending thereinto. The minor diameter bore 418 through which the lower extension portion 442 extends includes a seal recess therein within which a seal ring 450 and opposed retaining rings 452 are also disposed. The seal ring 450 in the recess in the minor diameter bore 418 seals the interface between the minor diameter bore 418 and the lower extension portion 442.

A piston 460 is located in, and is reciprocally moveable within, the major diameter bore 416 of the piston guide plate 402. The piston 460 includes a counterbore 462 extending therein from the spring housing 12 facing side thereof, which terminates in a bearing ledge 464 which is penetrated by a through opening 466. A second counterbore 470 extends inwardly of the lower face of the piston 460 facing away from the spring housing 12. The boss 444 of the lower extension portion 442 extends inwardly of the second counterbore 470, and the seal ring 450 in a recess in the piston 460 seals the interface of the piston 460 and major diameter bore 416. A fastener, such as a bolt, extends inwardly of counterbore 462, wherein the threaded shaft thereof is threaded into threads in the threaded bore 446 of the boss 444, and the head of the fastener bears against the bearing ledge 464, and thereby secures the piston 460 to the lower extension portion. Similarly to the first embodiment hereof, the springs 66, 68 of the spring housing bear against the spring piston 70 which contacts, and thus presses against, the spring housing 12 facing side of the piston 460. The space between the lower face of the piston 460 and the base of the major diameter bore 416, form a dampening volume 468. 424

Referring to FIGS. 11 and 12, the details of the dampening housing 400 are shown. Dampening housing 400 includes a first body 480 having a generally rectangular, in section, aspect, and a boss 482 extending from a face 484 thereof generally parallel to the first side of the body 14, and a second body 486, likewise having a generally rectangular, in section, aspect, and a bore 488 extending inwardly thereof into which the boss 482 of the first body 480 extends. A seal groove 490 extends inwardly of the inner circumference of the bore 488, within which is a packing such as a seal ring which seals the interface of the bore 488 and boss 482.

First body further includes a first cross flow passage 492 which extends into the first body from the body facing side thereof, and which opens into a first orifice passage 494 which extends form the intersection thereof with the first cross bore 494 into an orifice bore 496, which is a counter-bored recess extending into the face of the boss 482 of the first body 480 facing the second body within the bore 488. The user selectable dampening disk 402 having a specific size orifice 404 is located in the orifice bore 496, such that the fluid passage of the orifice 404 is fully exposed to the first orifice passage 494.

Second body 486 further includes a second orifice passage 498, aligned with the fluid passage of the orifice 404 so that the fluid opening is fully exposed to the second orifice passage 498, which terminates into a second cross flow passage 500 extending therefrom to the surface of the second body 486 facing and contacting the body 14 of the regulator. Where each of the first and second cross passages 492, 500 enter the first and second body respectively, a seal bore 502 which is a small depth counterbore 504 into the body facing sides thereof includes a packing such as a seal ring 506 therein, to seal the opening of the first and second cross passages 492, and the adjacent wall of the body 14 of the regulator. The first and second bodies 480, 486 are connected to each other by a plurality of fasteners such as bolts (not shown), and likewise to the body 14 of the regulator by a plurality of fasteners such as bolts (not shown). Thus, the dampening housing 400 is easily removed from the body 14 of the regulator 10, and the bodies 480, 486 separated from each other, to allow removal and replacement of the dampening disk 402.

The body 14 of the regulator is, in this embodiment, modified to include a first flow passage 510 in the form of cross bore 424 extending from the first side wall of the regulator body 14 and in fluid communication with the first cross passage 492 to the side of the 402 and into fluid communication with the flow passage 472 fluidly connected to the dampening volume 468, and a second flow passage 512 extending from fluid communication with the second cross flow passage 500 to the regulated fluid volume 206.

When an overpressure condition occurs in regulated fluid volume and the piston 460 moves to compress the springs 66, 68 in the spring housing and move from the position thereof in FIG. 11 to the position thereof in FIG. 12, communication, fluid flow between the dampening volume 468 and the regulated fluid volume 206 must flow therebetween via the passages in the dampening housing, and thus fluid in the regulated fluid volume 206 must pass through the orifice 404, which limits the flow rate of the fluid and thus dampens the moving speed of the piston 460. Likewise, when an underpressure condition occurs in the regulated fluid volume 206, and the piston moves in the direction of the position thereof in FIG. 12 toward the position thereof in FIG. 11, fluid can only flow from the dampening volume 468 to the regulated fluid volume 206 through the orifice 404, dampening the speed of movement of the piston. Because the first and second bodies 480, 486 of the dampening housing 400 are easily separated, the dampening response of the regulator 10 to overpressure and underpressure conditions of the regulated fluid volume 206 is easily changed by separating the bodies 480, 486, replacing the dampening disk 402 with a dampening disk having a different sized orifice 404, reassembly of the bodies 480, 486 to each other, and then reassembly of the dampening housing 400 to the body 14 of the regulator 10.

Figure 13:
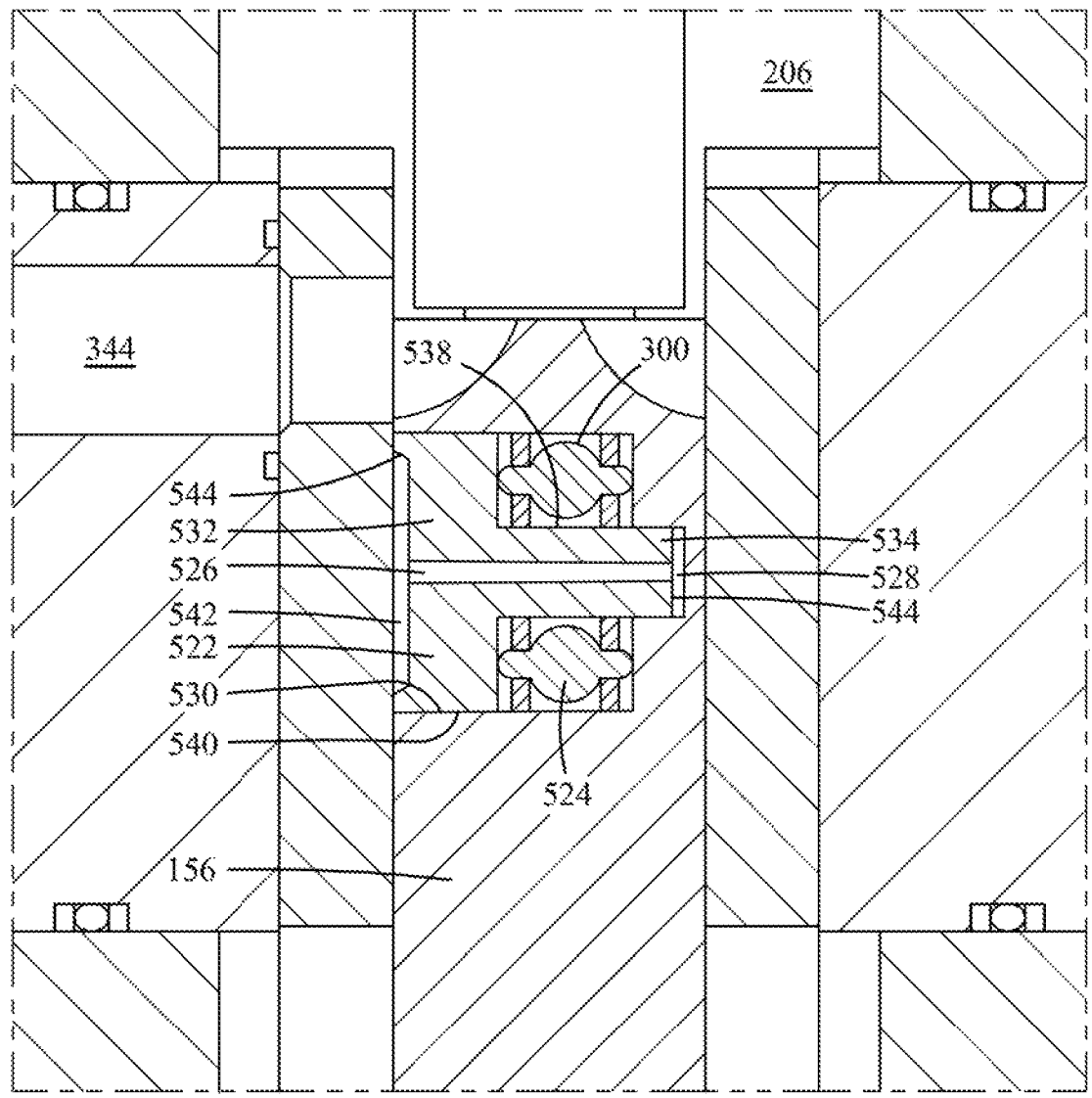
FIG. 13 is an enlarged view of valve seal in a blind bore.
Figure 14:
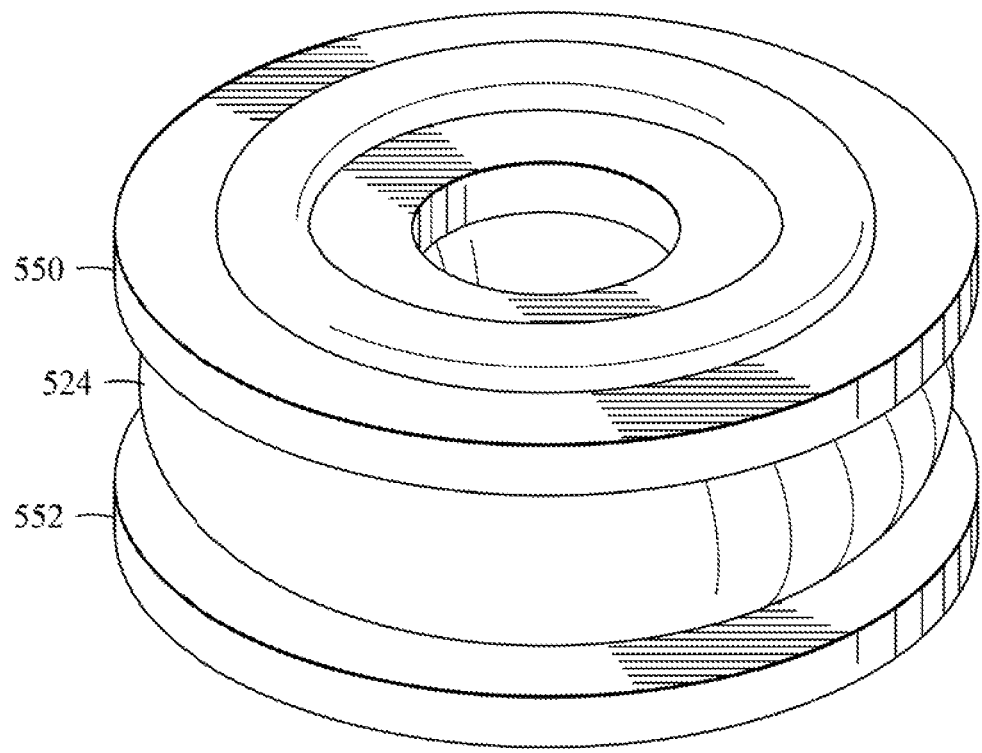
FIG. 14 is an isometric view of the seal element of the valve seal of FIG. 13.
Figure 15:
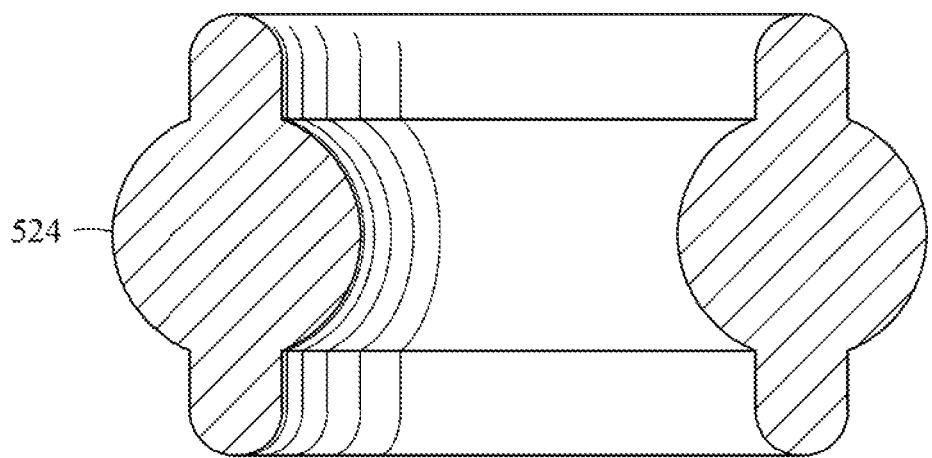
FIG. 15 is an isometric view of the key seal of the seal element of FIG. 14.

Referring now to FIGS. 13 to 15, an alternative seal structure 520 is disposed within the supply seal openings 164, 166, and a vent seal opening 168 in the gate 156 of the regulator 10. Unlike seal structure 300 and gate 156 of the first embodiment, wherein the supply seal openings 164, 166, and a vent seal opening 168 in the gate 156 are open to the internal fluid environment of the regulator, and the seal structure 300 is a two-piece sealing structure with a wave spring or other spring biasing element, the seal structure 520 hereof is a single piece sealing element 522 biased by a key seal 524. Additionally, the supply seal openings 164, 166, and a vent seal opening 168 in the gate 156 are modified into blind openings 530 in this embodiment, such that the seal structure 520 is located in the blind opening and bore. A passage 526 extending through the seal element 522 such that an isolated back passage 528 is formed between the seal element 522 and a portion of the blind opening 530.

Seal element 522 includes a major diameter portion 532, and a minor diameter portion 534 extending therefrom, such that an annular seal ledge 536 extends from the outer circumferential surface 538 of the minor diameter portion 534 and the outer circumferential surface 540 of the major diameter portion 532. At the end of the major diameter portion 532, a generally circular face 542 is formed, and a circumferential lip 544 extends outwardly thereof to form a sliding circumferential sealing surface. At the opposite end of the seal element, the end of the minor diameter portion 534 is likewise a generally circular surface 544. Passage 526 extends from an opening in the generally circular face 542 and through the seal element, where it opens through the generally circular surface 544.

Herein, when the gate 156 is positioned at the rest position and the blind openings 530 of the supply seal openings 164, 166, and a vent seal opening 168 in the gate 156 are aligned with the supply pressure openings and vent openings, the lips 544 of the seal elements 522 surround the openings. The supply pressure and the vent pressure communicates through the passage 526 to maintain that pressure against the circular surface 544, thereby aiding the key seal in biasing the sealing lip 544 against the surface surrounding the vent and supply openings, further ensuring an effective seal and reduced leakage from the regulated fluid volume 206 and these openings. To help maintain the alignment of, and prevent extrusion of, the key seal 524, retainer rings 550, 552 are provided on the flanks thereof.

Figure 16:
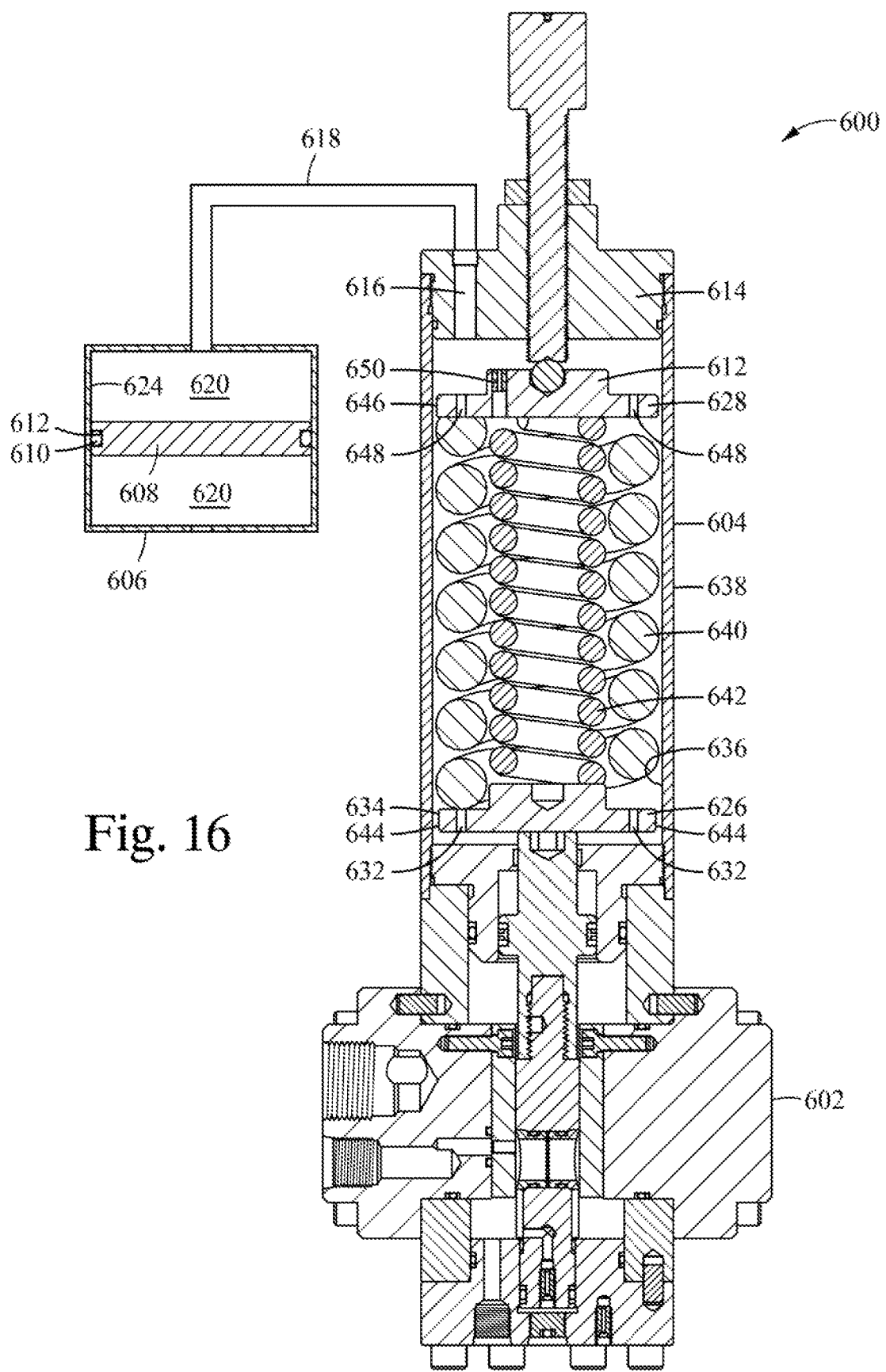
FIG. 16 is a sectional view of an additional embodiment of the regulator hereof, wherein the spring housing is sealed and connected with a reservoir.

Referring now to FIG. 16, an alternate construct of a pressure regulator 600 is shown in section, wherein the spring housing 604 on the body 602 is modified compared with the embodiments hereof in FIGS. 1 to 14. Here, the spring housing 604 is sealed and fluidly connected to a reservoir 606 having a floating piston 608 therein. In contrast to the spring housing 12 of FIG. 4, spring housing 604 does not include the openings 62 in the sidewalls thereof. Additionally, the guide plate 614 includes an opening 616 extending therethrough, which is connected to a hydraulic line 618 fluidly connected to reservoir 696. Reservoir includes a vented portion 622 and a relief fluid portion 620 separated by the floating piston 608. A seal groove 610, having a seal 612, such as an o-ring therein. The o-ring seals against the base of the groove 610 and the inner bore 624 of the reservoir. Reservoir 606 provides a volume of fluid, and accepts and releases that volume of fluid, from and to the relief fluid portion in response to movement of the piston 626 and bias plate 628.

Piston 626 includes a plurality of openings 632 therethrough, and the outer circumference 634 thereof is slightly smaller than the inner circumference 636 of the spring tube 638 surrounding the piston 626, the bias plate 628, and the springs 640, 642 therebetween. As the piston 626 moves from the position thereof shown in FIG. 16 in the direction of the guide plate 614, openings 632 and the circumferential gap 644 between the outer circumference 634 of the piston and inner circumference 636 of the spring tube act as dampening orifices, allowing fluid to pass therethrough. Bias plate 628 likewise includes openings 648 therethrough, and a circumferential gap 650, and well as a secondary opening therethrough within which an orifice insert is provided.

When an over or under-pressure condition of the regulated fluid occurs, the piston 626 moves with respect to the tube, pushing or pulling fluid ahead of the guide plate 628 facing side thereof, which fluid flows into, or from the relief fluid portion 620 of the reservoir 606.

Referring to FIGS. 17 to 20, an additional construct of a pressure regulator is provided herein. As discussed previously herein, spring body 12 hereof generally includes a thin walled tubular body 52 composed of, for example, stainless steel, and having opposed open ends 54, 56, a circumferential inner wall 58 surrounding an interior volume of the spring housing 12, and a circumferential outer wall 60, whereby spring components are circumferentially surrounded by the circumferential inner wall 58. A user variable biasing assembly 64 is partially provided within tubular body 52, and therein includes a major diameter coil spring 66, a minor diameter coil spring 68 disposed within the circumference of the major diameter coil spring 66, a spring piston 70 contacting a first end of each of the coil springs 66, 68 adjacent to the body 14, and a bias setting plate 72 contacting the opposed ends of each of the coil springs 66, 68. Each of the spring piston 70 and the bias plate 72 have an outer circumferential surface corresponding in shape to the inner wall 58 of the tubular body 52, and are slightly smaller in circumference than inner wall 58 and thus are both free to move linearly within tubular body 52. Spring piston 70 includes an outer annular support face 74 and a boss 78 extending from within the circumference of the annular support face 74 and therefrom inwardly of the tubular body 52. A first end of the major diameter coil 66 spring bears against the annular support face 74. A first end of the inner coil spring 68 bears against boss 78. An annular face portion 80 is provided opposed to the annular support face 74 and boss 78, and is configured to contact a plunger extending from the body 14 of the regulator 10, as will be described herein. Annular face surrounds a first shallow recess 398, within which is centered a second recess 399.

Figure 17:
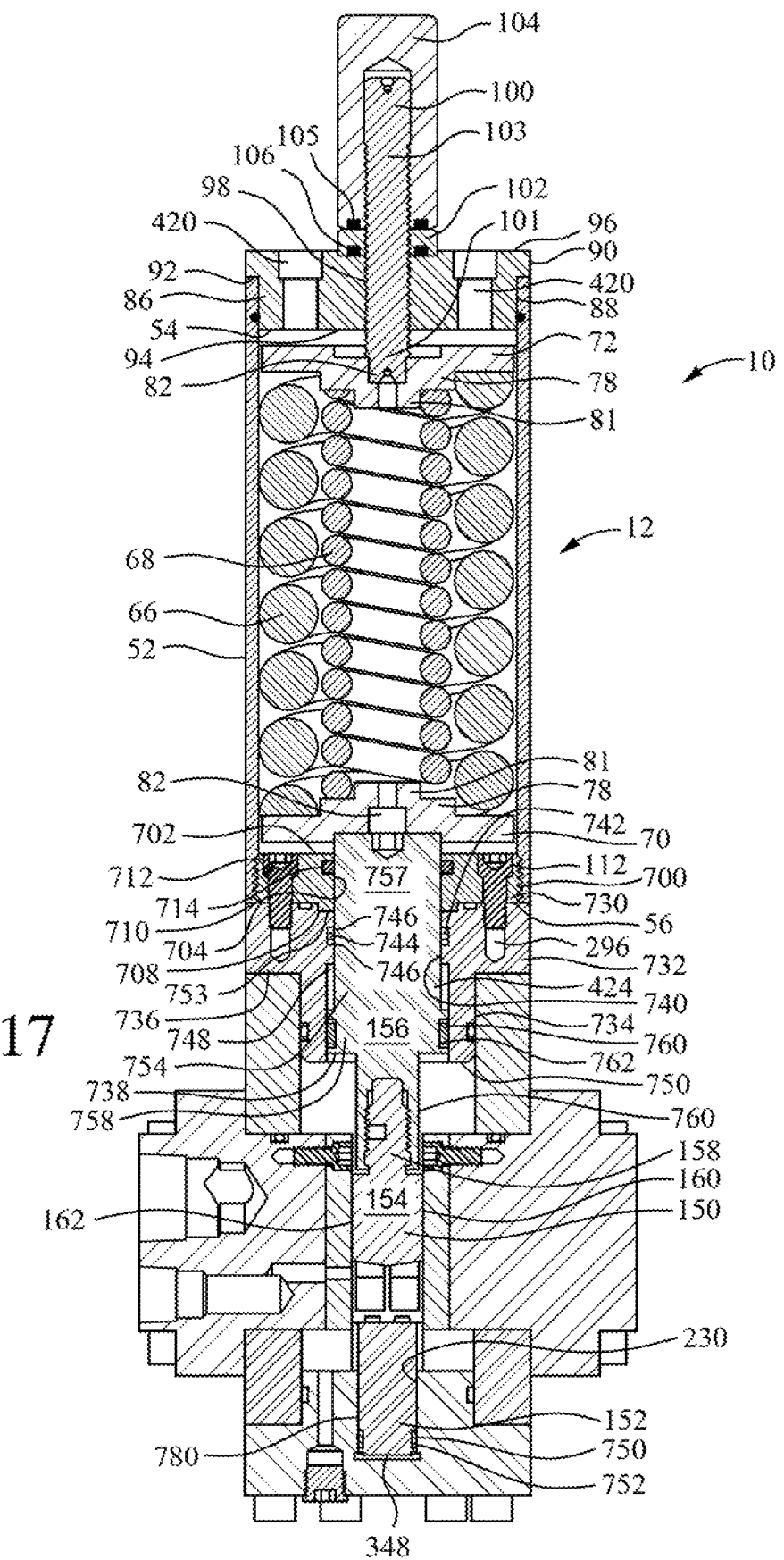
FIG. 17 is a sectional view of an additional embodiment of the regulator hereof, wherein the spring housing is sealed and connected with a reservoir, and pressure is equalized on opposed sides of a dampening piston through a split ring disposed on the outer surface of the dampening piston.

For ease of manufacture and assembly, the bias setting plate 72 has the same general configuration as the spring piston 70. A second end of the major diameter coil 66 spring bears against the annular support face 74 of the bias setting plate, and a second end of the inner coil spring 68 bears against boss 78 thereof. On both the bias setting plate 72 and spring plate 70, a spring pilot 81 extends from the boss 78, and is sized to have an outer diameter nearly equal to the inner diameter of minor diameter coil spring 68 to prevent radial movement of minor diameter spring 68 within the spring body 12. Likewise, the outer circumferential surface of the bosses 78 form a pilot which is sized to have an outer diameter nearly equal to the inner diameter of major diameter coil spring 66 to prevent radial movement of major diameter spring 66 within the spring body 12. To reduce the number of individual different parts used in the regulator, the spring piston 70 may also include this recess 82, as is shown in FIG. 17.

Opposed open ends 54, 56 of tubular body 52 here are threaded, and open end 54 of tubular body 52 is provided with a guide plate 86 having a minor diameter outer circumferential threaded wall 88 extending inwardly of the end 54 of tubular body 52, a major diameter outer circumferential wall 90 disposed outwardly of tubular body 52, an annular limit flange 92 extending between the minor diameter outer circumferential wall 88 and major diameter outer circumferential wall 90 and overlying the end of the tubular body 52, a generally circular inner face 94 within the tubular body 52 facing the bias setting plate 72, and a generally circular outer face 96 facing away from inner face and located exterior to tubular body 52. The guide plate 86 is secured to the open end of tubular body 54 such as by providing threads on minor diameter outer circumferential wall 88 and mating threads inwardly of the open end 54 of tubular body as shown in FIG. 17, or by welding guide plate 86 to the open end 54 of tubular body 52, or other mechanisms. A threaded opening 98 extends through the guide plate 86 from outer surface 96 to inner surface 94 thereof, and is generally centered with respect to minor diameter outer circumferential threaded wall 88 and major diameter outer circumferential wall 90. A threaded bias rod 100 is threaded through the threaded opening and a first end 101 thereof extends inwardly of the tubular body 52 and is received in recess 82 in spring bias plate 72. The first end 101 may include a detent therein into which a portion of a ball (not shown) in recess 82 is received. The second end 103 of threaded rod 100 extends outwardly of the tubular body 52 and of outer face 96 of guide plate 86. A threaded nut 102 is provided over the threaded rod 100 on the portion thereof extending outwardly of the outer surface of guide plate 86. To adjust the extension of the first end 101 of threaded rod 100 inwardly of tubular body 52, and thus the position of the spring bias plate 78 relative to the adjacent end of the tubular body 52 to set a desired major diameter and minor diameter spring 66, 68 bias, the threaded rod 100 is rotated while the nut 102 is located in a backed away position from outer surface 96 of guide plate 86. When the desired position of the end 101 of threaded rod 100 inwardly of guide plate 86 is attained, the nut 102 is rotated and thereby tightened on threaded rod 100 to bear against the outer surface 96 of the guide plate 86, thereby locking the threaded rod 100 in position. The threaded rod 100 position can be easily changed by backing off the nut 102, turning threaded rod 100 clockwise or counter clockwise, and re-securing nut 102 to bear against the outer surface 96 of guide plate 86. A protective cap 104 is threaded over the portion of threaded nut 100 extending outwardly of nut 102 on the exterior of the guide plate 86. Each of the cap 104 and the nut 102 include a seal 105, 106 extending inwardly of the spring facing surface of the cap 104 and the nut 102, and seal 105 seals around the threaded rod 100 between the nut 102 and cap 104, and seal 106 seals around the threaded rod 100 between the nut 102 and the guide plate 86.

As shown in FIGS. 17 to 20, body 14 is configured to retain hydraulically operable components and includes many of the same components as the body 14 of FIGS. 4 and 5, including a seal carrier plate 150 integrally including at an end thereof distal of the spring housing 14 a dampening piston 152, and connected at the other end thereof to a plunger 154 extending therefrom into contact with the spring piston 70 bearing against the end thereof. Herein, seal carrier plate 150 is configured as a generally rectangular plate formed as a gate 156 from which extend the generally right cylindrical, in section, dampening piston 152, and at the opposite end of the gate 156, a plunger boss 158, likewise generally right cylindrical in section. The opposed large rectangular faces 160, 162 of gate 156 are pierced by three openings extending through the gate 156, two, side by side, supply seal openings 164, 166 and a vent seal opening 168 as shown in FIG. 5. The center of the vent seal opening 168 lies along a center line 170 of both the plunger boss 158 and the dampening piston 152, and the vent seal opening 168 extends through the gate 156 at a position between the side by side supply seal openings 164, 166 and the dampening piston 152 as shown in FIG. 5.

At the lower open end 56 of tubular body 52 is provided a piston guide plate 110. In FIGS. 4 and 5, piston guide plate 110 includes an integral piston bore formed therein, whereas here, the piston guide plate includes a plate like portion 730 and a separate piston housing 732 fastened thereto, wherein the piston housing 732 extends inwardly of the body 14 and the plate like portion 730 rests on an end wall of the piston housing 732, which in turn rests on an end wall of the body 14. Plate like portion 430 includes a threaded outer circumferential surface 700, an inwardly facing generally circular wall 702 received within tubular body 52, an outwardly facing annular wall 704 facing away from wall 702, and an annular boss 708 generally centered in the annular wall 704 and surrounding a through piston bore 710. A plurality of counterbored fastener bores 712 extend through the plate like portion 730 and are spaced about the circumference of the annular boss 708. A seal groove 714 extends inwardly of the inner circumference of the piston bore 710, and a seal 716 such as an O-ring, a packer or a wiper type seal is received therein.

Piston housing 732 is a generally right cylindrical member including a minor diameter boss 734 extending inwardly of the body 14 from a major diameter flange 736, a first diameter piston bore 738 extending inwardly of the end of minor diameter boss 734 extending inwardly of the body 14 from a first end 750 thereof, and a second diameter piston bore 740, smaller in diameter than first diameter piston bore 738, located distal to the end of minor diameter boss 734 extending inwardly of the body 14, and an annular limit ledge 748 formed and the intersection of the first and second piston bores 738, 740. A seal groove 742, having a seal ring 744 such as a T-seal with integrated backup rings 746 (FIGS. 19 and 20) to either side of the seal ring 744 disposed therein, is located to extend circumferentially inwardly of the wall of the second diameter piston bore 740, intermediate of the annular limit ledge 748 and the second end 753 of the piston housing 732. Second end 753 rests against annular boss 708 of plate like portion 730.

Plunger 154 in this embodiment is configured as a right cylindrical member including a minor diameter portion 756 sized to extend through second piston bore with clearance therebetween, such that the outer surface of minor diameter portion 756 engages against seal ring 744, and a major diameter portion 758 sized to be received within first piston bore 738 with clearance therebetween, and a connecting stem 174 extending from the major diameter portion 758 and threadingly engaged to the plunger boss 158 of the gate 154.

Figure 19:
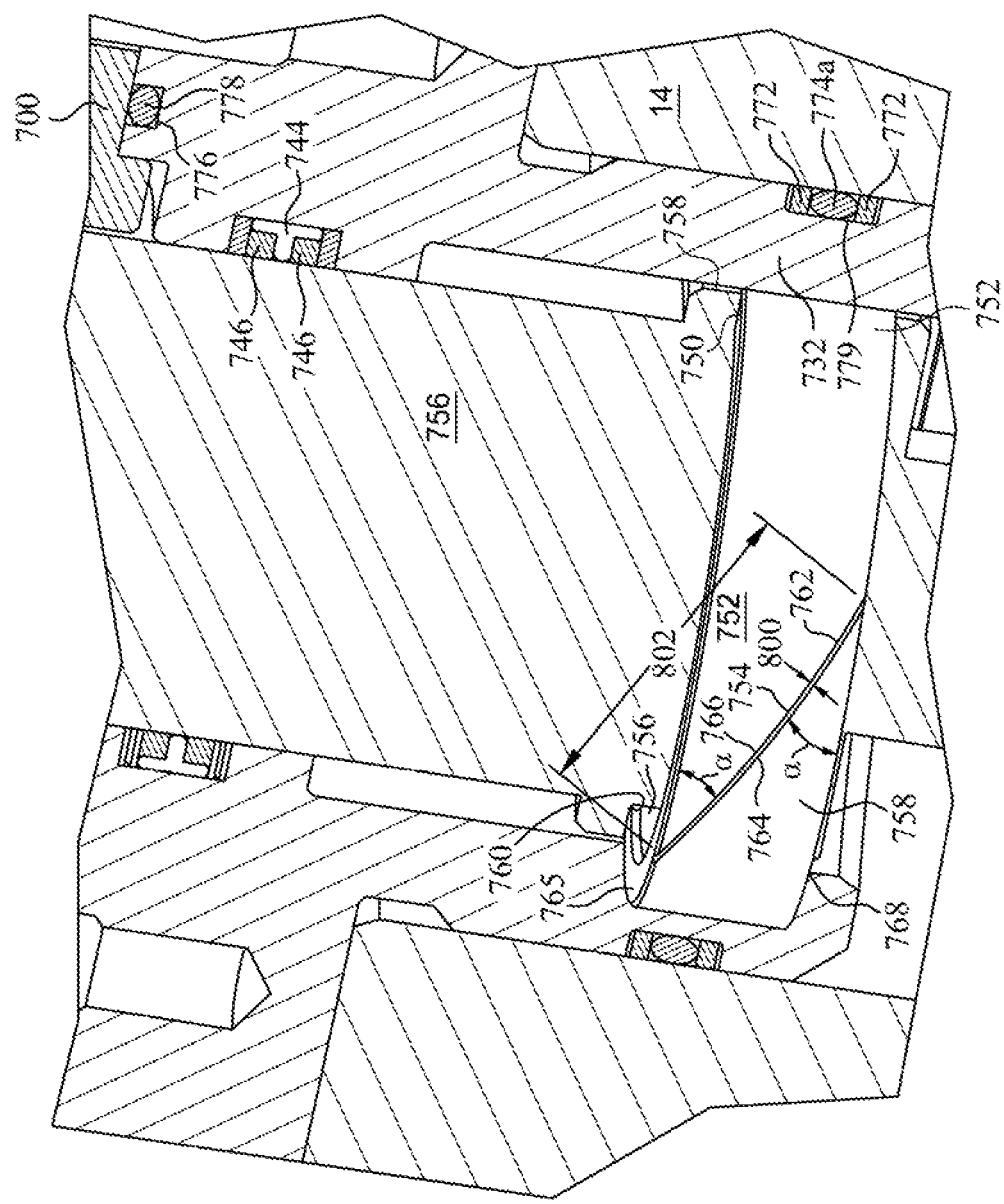
FIG. 19 is a partial isometric view of the split ring on the outer cylindrical surface of the plunger of the regulator of FIG. 17.

Referring to FIGS. 17 and 19, major diameter portion 758 includes a wear band recess 750 extending inwardly thereof, within which a generally flat, rectangular in cross section, split band 752 is received. Split band 752 includes a generally flat, circumferential inner wall 757 engageable against the base 760 of band recess 750, and an outer, generally flat, circumferential surface 758, and opposed end walls 762 or 764 facing one another across a gap 766. Here, band 752 is scarf cut, such that the angle α between an end wall and one of the side walls 765, 768 is an acute angle, and the gap 766 extends in a circumferential direction between the opposed side walls 765, 768 of the band 752. Additionally, as best shown in FIG. 19, minor diameter boss 734 of piston housing 732 includes on the outer surface thereof a seal recess 779, within which a seal ring, such as an O-ring 774a, disposed between opposed side rings 772, is disposed to seal the interface between the minor diameter boss 732 of the piston housing and the adjacent surface of the bore of the body 14. Additionally, a seal groove 776 extends inwardly of the face of the piston housing 732 facing the plate like portion, and a seal ring 778 disposed therein, such as an O-ring, seals across the interface region therebetween.

Figure 20:
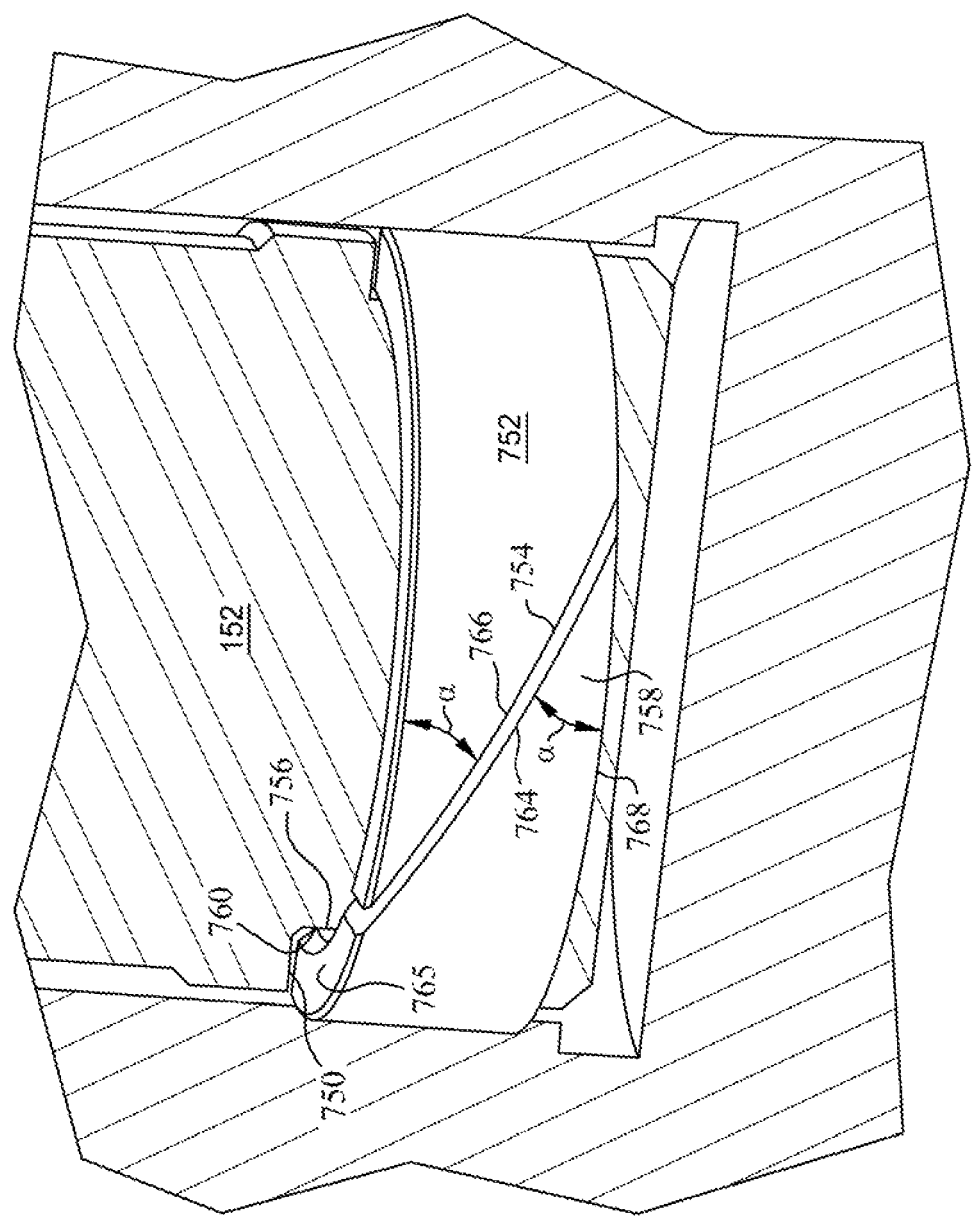
FIG. 20 is a partial isometric view of the split ring on the outer cylindrical surface of the regulating piston of the regulator of FIG. 17.

Referring now to FIGS. 17 and 20, the configuration of the dampening piston 152 is shown. Dampening piston 152 is here an integral extension of the gate 154, but may be configured as a separate element connected to the gate 154. Here, in contrast to the dampening piston of FIGS. 4 and 5, there are no internal passages through the piston body to allow fluid flow between the opposed sides thereof. Instead, the outer circumferential surface 780 of the dampening piston 152 is sized to allow the dampening piston 152 to slide within dampening bore 230 with slight clearance therebetween, and a wear band recess 750 extending inwardly thereof, within which a generally flat, rectangular in cross section, split band 752 is received, is provided to span the annular gap between the outer circumferential surface of the dampening piston 152 and the inner circumferential surface of the dampening bore 230. Split band 752 includes a generally flat, circumferential inner wall 757 engageable against the base 760 of band recess 750, and an outer, generally flat, circumferential surface 758, and opposed end walls 762, 764 facing one another across a gap 766. Here, band 752 is scarf cut, such that the angle α between an end face and one of the side walls 765, 768 forming the side walls of the gap 766 is an acute angle, and the gap 766 extends in a circumferential direction between the opposed side walls 765, 768 of the band 752.

Figure 18:
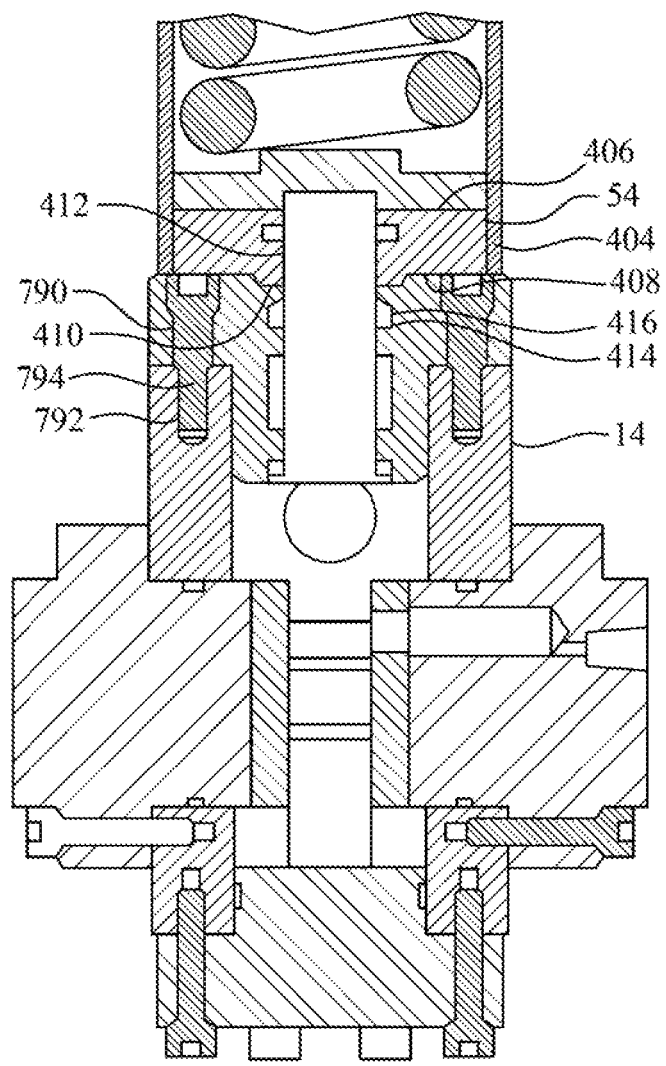
FIG. 18 is an additional sectional view of the regulator of FIG. 17.

To secure spring housing 12 to the body 14, piston housing 732 includes a plurality of counterbored apertures 790 extending therethrough, and the upper end of body 14 includes a plurality of aligned threaded apertures 792 extending thereinto. A threaded fastener 794, such as a bolt having a threaded portion and an enlarged head with a hex key or other tool connection recess therein extends inwardly of the counterbored apertures 790 and is threaded into the threaded apertures 792 to secure the piston housing to the body 14, as shown in FIG. 18. In similar fashion, threaded fasteners 794 extend inwardly of the counterbored fastener bores 712 which extend through the plate like portion 730, and are threaded into aligned threaded openings 796 in the upper surface of the piston housing 732. The tubular body 52 of the spring housing is threaded over the outer circumferential surface 700 of the plate like portion 730, and the thus the spring housing 12 is secured to the body 12 of the regulator 10.

Spring housing 12 of FIG. 17 provides a pressurizable interior volume, the pressure within which is selectable by a user of the regulator 10 introducing a gas, such as air or nitrogen or other relatively inert species, into the volume surrounded by the guide plate 86, the tubular body 14, and the piston guide plate 110. Guide plate 86 thus further includes two openings 420 extending therethrough for receipt of threaded fittings. One opening 420 is connected to a pressure compensator, such as a reservoir 606 having a floating piston 608 therein as shown in FIG. 16 and described herein with respect to that Figure. The other of the openings is configured to receive a sealable fitting to enable charging the interior of the tubular body 52 with a gas such as air or nitrogen, and seal when the pressure on the exterior side thereof is less than the pressure within the tubular body 52.

Regulator 10 of FIGS. 17 and 18 operates in a similar way to the regulators of FIGS. 1 to 16 hereof, except that the gaps 766 formed through the wear bands 752 in the plunger 154 and the dampening piston 152 provide the flow paths to allow fluid to flow to the opposed sides of the plunger 154 and the dampening piston 152 to allow dampened movement of the gate 156 during operation of the regulator 10 to regulate pressure in a flow line to which it is connected, and to allow fluid pressure at a first side of the regulating piston 152 or plunger 154 to become exposed to that fluid pressure on an opposed side thereof. The dampening characteristic of the dampening piston 152, which is combination with the fluid pressure in the spring housing 12 and the spring constants of the major and minor diameter springs 66, 68, together define the operational characteristics of the regulator 10. The more rapidly the fluid pressure in the variable dampening volume 348 reaches that on the opposed side of the dampening piston 152, the faster the gate 154 can move in the regulator. The gaps 766 defined by the cross section (width 800 of the gap 766 and depth of the gap 766 generally equal to the thickness of the band) define an orifice through the band which allows fluid communication thereacross and thereby allow the pressure on opposed sides of the regulating piston 152 to gradually equalize. By changing the band 752 to change the cross section of the gap 766, different dampening characteristics can be achieved by the user of the regulator. The angle α between the walls 762, 764 of the gap 766 and the opposed side walls 765, 768 of the band 752 also affects the dampening characteristics of the pressure regulator 10. By having an acute angle α, fluid under pressure has to pass circumferential along the circumference of the groove within which the band 752 is present, slowing the fluid flow and fluid pressure equalization thereacross. Thus, changing the angle α, as well as the cross section of the gap 766, effect the dampening characteristics of the pressure regulator 10.

The band 762 also provides a centering function to help center the plunger 154 and dampening pistons 152 within their respective bores. The bands 762 are preferable thicker in the direction between the inner and outer circumferential walls 756, 758 thereof than the depth of the groove in which they are retained, such that the outer circumferential surface extends outwardly of the groove to space the regulating piston 152 and plunger 154 from the adjacent wall of their respective bores. The bands 752 are preferable configured of a material such as Teflon®, Vespel®, or a PEEK material, and thus provide the primary wear surface of the band-to-bore sliding interface, and are replaceable to extend the service life of the regulator 10. Additionally, as the bands 752 are discontinuous, they may be opened radially to fit over the groove or recess into which they fit and released to snap into place therein.

While the foregoing is directed to embodiments of the present disclosure, other and further embodiments of the disclosure may be devised without departing from the basic scope thereof, and the scope thereof is determined by the claims that follow.

The invention claimed is:

1. A pressure regulator, comprising:
a body comprising a regulated fluid volume, at least one vent passage and fluid supply passage, a dampening piston bore including a variable dampening volume and one regulated fluid volume outlet passage;
a regulated fluid pressure piston, said piston having a first surface exposed to the regulated fluid volume, and a second surface exposed outwardly of the body;
an external biasing member contactable with the second surface of the piston and providing a force on the piston directed inwardly of the body;
a gate connected to the piston and having a first seal and a second seal;
a dampening piston disposed in the dampening piston bore, the dampening piston disposed between the dampening volume of the dampening piston bore and the regulated fluid volume, the dampening piston including a recess including a band therein having at least one gap therethrough;
the gap in the band forming a passage wherein a volume formed within the gap between the dampening piston and the piston bore is communicable with a volume exterior to the region between the dampening piston and the piston bore.

2. The pressure regulator of claim 1, wherein the gap has a gap width defined between facing surfaces of the band; and
the size of the gap defines, at least in part, the dampening characteristics of the dampening piston.

3. The pressure regulator of claim 1, wherein:
the gate includes a first seal opening and a second seal opening having a first spacing therebetween;
the vent passage and the fluid supply passage opening into the regulated fluid volume with the first spacing therebetween; whereby,
when the pressure in the regulated fluid volume is within a set point pressure range, the first seal extends around the vent passage to seal the vent passage from the regulated fluid volume, and the second seal extends around the supply pressure passage to seal the supply pressure passage form the regulated fluid volume.

4. The pressure regulator of claim 1, wherein the external biasing member comprises at least one spring and a user selectable spring bias force adjustor.

5. The pressure regulator of claim 1, wherein the spring bias force adjuster comprises a housing covering the spring, a first plate located within the housing and contacting the second face of the piston and a first end of the spring, a second plate located in the housing and contacting the second send of the spring, and a setting rod having a first end in contact with the second plate, wherein the distance of the first end of the setting rod from the internal surface of the housing is variable.

6. The pressure regulator of claim 1, wherein the external biasing member comprises a sealed housing having a sealed internal volume.

7. The pressure regulator of claim 6, further comprising a fluid reservoir fluidly connected to the sealed internal volume of the sealed housing.

8. The pressure regulator of claim 7, wherein the fluid reservoir comprises a first fluid volume, a second fluid volume, and a floating piston interposed therebetween.

9. A pressure regulator, comprising:
a body comprising a regulated fluid volume, at least one vent passage and fluid supply passage, a dampening piston bore and one regulated fluid volume outlet passage;
a regulated fluid pressure piston, said piston having a first surface exposed to the regulated fluid volume, and a second surface exposed outwardly of the body;
an external biasing member contactable with the second surface of the piston and providing a force on the piston directed inwardly of the body;

a gate connected to the piston and having a first seal and a second seal;

a dampening piston disposed in the dampening piston bore and an annular gap therebetween, the dampening piston disposed between a dampening volume and the regulated fluid volume;

an orifice member having an orifice therein disposed between the dampening volume and the regulated fluid volume and across the annular gap between the dampening piston and the dampening piston bore, the orifice having a cross sectional area for fluid communication between the dampening volume and the regulated fluid volume, the cross sectional area of the orifice being less than the cross sectional area of the annular gap between dampening piston disposed in the dampening piston bore.

10. The pressure regulator of claim 9, wherein:
the dampening piston comprising an outer circumferential surface extending in a height direction and a circumferential direction within the piston bore; and the orifice extends in the height direction and the circumferential direction.

11. The pressure regulator of claim 10 wherein the orifice member comprises a band disposed on the circumferential surface of the regulating piston, the band having a gap therein forming the orifice.

12. The pressure regulator of claim 11, wherein the circumferential surface of the regulating piston is a circumferential groove having a circumferential base.

13. The pressure regulator of claim 11, wherein the band extends across the annular gap.

14. The pressure regulator of claim 11, wherein the band extends from the circumferential base and across the annular gap.

* * * * *